(12) United States Patent
Kuwabara et al.

(10) Patent No.: US 11,674,912 B2
(45) Date of Patent: Jun. 13, 2023

(54) X-RAY DIFFRACTION MEASUREMENT APPARATUS AND METHOD

(71) Applicant: HONDA MOTOR CO., LTD., Tokyo (JP)

(72) Inventors: Junji Kuwabara, Saitama (JP); Kenji Sato, Saitama (JP); Atsushi Tamai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/665,607

(22) Filed: Feb. 7, 2022

(65) Prior Publication Data
US 2022/0307995 A1 Sep. 29, 2022

(30) Foreign Application Priority Data
Mar. 29, 2021 (JP) ............................. JP2021-055914

(51) Int. Cl.
*G01N 23/207* (2018.01)
*G01N 23/20008* (2018.01)

(52) U.S. Cl.
CPC ..... *G01N 23/20008* (2013.01); *G01N 23/207* (2013.01)

(58) Field of Classification Search
CPC .......... G01N 23/20008; G01N 23/207; G01N 23/201; G01N 2223/054; G01N 23/205; G01N 2223/056
See application file for complete search history.

(56) References Cited

U.S. PATENT DOCUMENTS

| | | | |
|---|---|---|---|
| 2009/0228216 A1* | 9/2009 | Harding | G01N 23/20083 702/28 |
| 2015/0055756 A1* | 2/2015 | Nakazawa | C23C 2/28 378/71 |
| 2018/0202948 A1* | 7/2018 | Sato | G01N 23/207 |

FOREIGN PATENT DOCUMENTS

JP          6383018 B2    8/2018

* cited by examiner

*Primary Examiner* — David P Porta
*Assistant Examiner* — Mamadou Faye
(74) *Attorney, Agent, or Firm* — CKC & Partners Co., LLC

(57) ABSTRACT

The present invention provides an X-ray diffraction measurement apparatus configured to measure properties of an object to be measured M based on X-ray diffraction generated by the object to be measured at an intersection position between an incident optical axis and outgoing optical axes, the X-ray diffraction measurement apparatus including: three slits of a linear shape through which X-rays pass and that are arranged so as to be inclined in an axial direction of the outgoing optical axis; a first two-dimensional detector and a second two-dimensional detector that detect the X-rays passing through the slits within a detection region; and a profile calculator that calculates diffraction profiles indicating intensities of the passing X-rays detected by the two-dimensional detectors, for each of the passing X-rays, thereby being capable of simultaneously obtaining measurement results relating to properties of a plurality of materials having different diffraction angles.

7 Claims, 17 Drawing Sheets

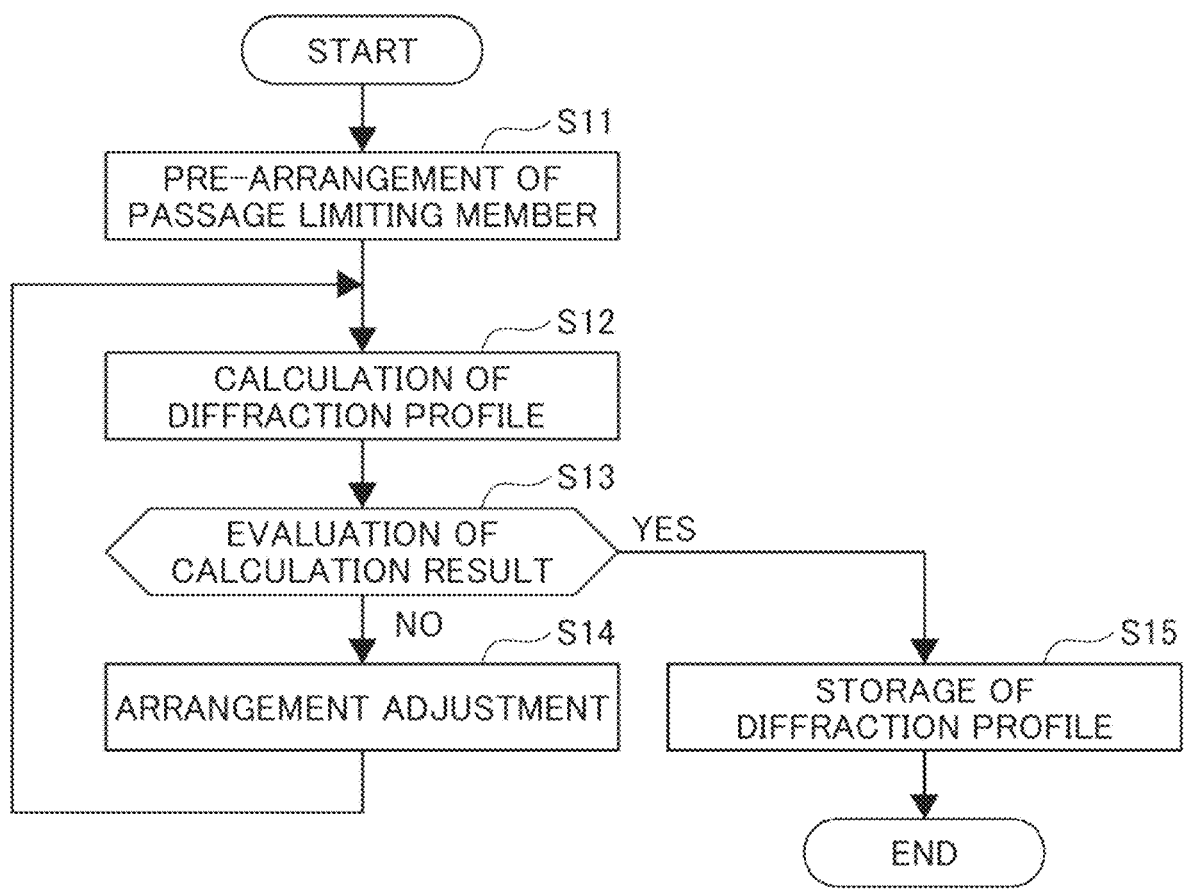

DIFFRACTION ANGLE RESOLUTION

SPATIAL RESOLUTION

X-RAY DIFFRACTION MEASUREMENT APPARATUS AND METHOD

This application is based on and claims the benefit of priority from Japanese Patent Application No. 2021-055914, filed on 29 Mar. 2021, the content of which is incorporated herein by reference.

BACKGROUND OF THE INVENTION

Field of the Invention

The present invention relates to an X-ray diffraction measurement apparatus and method.

Related Art

In the related art, an X-ray diffraction measurement method has been known for measuring properties of an object to be measured by detecting a diffraction pattern (hereinafter also simply referred to as a "pattern") by radiating X-rays toward the object to be measured. For example, in order to improve measurement efficiency, various methods have been proposed in which a combination of a two-dimensional slit and a two-dimensional detector is used. The applicant has already proposed an X-ray diffraction measurement apparatus and method capable of effectively measuring an object to be measured by a single X-ray detection operation (see, for example, Patent Document 1).

Patent Document 1: Japanese Patent No. 6383018

SUMMARY OF THE INVENTION

According to the X-ray diffraction measurement apparatus and method disclosed in Patent Document 1, in a case of a test in which a plurality of material having different diffraction angles are used and a diffraction position changes with time, for example, such as In-situ observation at the time of charging and discharging a lithium ion battery, only one material (for example, a positive electrode material ($LiCoO_2$)) is in an observation range, and it is necessary to change a position of a field-of-view limiting slit and perform the experiment again at the time of observing another material (for example, a negative electrode material (graphite)). In this case, the correct measurement result cannot be obtained even when In-situ measurement of each material is performed to combine measurement results, for example, in a case of charge/discharge conditions or materials in which properties change with one charge/discharge.

The present invention has been made in view of the above circumstances, and is to provide an X-ray diffraction measurement apparatus and method capable of simultaneously obtaining measurement results relating to such properties of a plurality of materials having different diffraction angles.

(1) An X-ray diffraction measurement apparatus (for example, an X-ray diffraction measurement apparatus 10 to be described below) configured to measure properties of an object to be measured (for example, an object to be measured M to be described below) based on X-ray diffraction generated by the object to be measured at an intersection position (for example, an intersection position 34 to be described below) between an incident optical axis (for example, an incident optical axis 30 to be described below) and outgoing optical axes (for example, outgoing optical axes 32a, 32b, and 32c to be described below), the X-ray diffraction measurement apparatus including: passage limiting members (for example, a first passage limiting member 26a, a second passage limiting member 26b, and a third passage limiting member 26c to be described below) having linear slits (for example, a first slit 24a, a second slit 24b, and a third slit 24c to be described below) through which X-rays are allowed to pass after the X-ray diffraction; two-dimensional detectors (for example, a first two-dimensional detector 18a and a second two-dimensional detector 18b to be described below) configured to detect the X-rays, which have passed through the slits, within a detection region; and a profile calculator (for example, a profile calculator 44 to be described below) configured to calculate a diffraction profile indicating an X-ray intensity with respect to a diffraction angle of the object to be measured, based on a two-dimensional X-ray image detected by the two-dimensional detectors, wherein a plurality of the passage limiting members are provided on a plurality of the outgoing optical axes corresponding to different diffraction angles, respectively, each of the plurality of passage limiting members is disposed in a manner such that the slit is inclined (for example, an inclination angle $\phi$ to be described below) at least in an axial direction of the outgoing optical axis corresponding to the slit with respect to an orthogonal direction (for example, an orthogonal direction A to be described below) which is orthogonal to both the incident optical axis and the outgoing optical axis corresponding to the slit, each of the two-dimensional detectors detects each of intensities of passing X-rays corresponding to the plurality of passage limiting members, and the profile calculator calculates each of diffraction profiles, which are related to the passing X-rays of the plurality of passage limiting members, respectively, for each of the passing X-rays, based on outputs of the two-dimensional detectors.

(2) In the X-ray diffraction measurement apparatus according to (1), the two-dimensional detectors include a first two-dimensional detector (for example, a first two-dimensional detector 18a to be described below) arranged at a position of a low-angle peak in an X-ray diffraction peak and a second two-dimensional detector (for example, a second two-dimensional detector 18b to be described below) arranged at a position of a high-angle peak in the X-ray diffraction peak, and the first two-dimensional detector has a narrower detection region and higher spatial resolution than the second two-dimensional detector.

(3) In the X-ray diffraction measurement, apparatus according to (1), the passage limiting members include a passage limiting member (for example, a first passage limiting member 26a to be described below) of a first form provided on the outgoing optical axis corresponding to a diffraction angle of an ultra-low angle and passage limiting members (for example, a second passage limiting member and a third passage limiting member 26c to be described below) of a second form provided on the outgoing optical axes corresponding to a diffraction angle of a wider angle than the ultra-low angle.

(4) In the X-ray diffraction measurement apparatus according to (3), the two-dimensional detectors include a first two-dimensional detector (for example, a first two-dimensional detector 18a to be described below) arranged at a position of a low-angle peak in an X-ray diffraction peak and a second two-dimensional detector (for example, a second two-dimensional detector 18b to be described below) arranged at a position of a high-angle peak in the X-ray diffraction peak, and the first two-dimensional detector has a narrower detection region and higher spatial resolution than the second two-dimensional detector, the first two-dimensional detector detects an intensity of a passing X-ray from a first passage limiting member (for example, a first passage limiting member 26a to be described below), which is the one passage limiting member corresponding to the first form, and the second two-dimensional detector detects intensities of passing X-rays from a second passage limiting member (for example, a second passage limiting member to be described below) and a third passage limiting member (for example, a third passage limiting member 26c to be described below) which are the two passage limiting members corresponding to the second form.

(5) In the X-ray diffraction measurement apparatus according to (4), the first passage limiting member, the second passage limiting member, and the third passage limiting member are arranged in a manner such that at least any position and/or posture of positions in an in-plane direction (for example, an in-plane direction of an xz plane to be described below) orthogonal to the outgoing optical axes corresponding to the first passage limiting member, the second passage limiting member, and the third passage limiting member, positions in directions of the outgoing optical axes, and rotational postures (for example, an inclination angle $\phi$ which is an inclination angle in the inclination direction B with respect to the orthogonal direction A to be described below) around the outgoing optical axes is adjustable, and a servo mechanism (for example, a servo mechanism 28 to be described below) is provided to adjust the positions and/or the postures of the first passage limiting member, the second passage limiting member, and the third passage limiting member based on an output of the profile calculator.

(6) In the X-ray diffraction measurement apparatus according to (5), the servo mechanism adjusts independently the positions and/or the postures of the first passage limiting member, the second passage limiting member, and the third passage limiting member, for each of the first passage limiting member, the second passage limiting member, and the third passage limiting member.

(7) In the X-ray diffraction measurement apparatus according to (1), each of the passage limiting members is a tungsten plate.

(8) An X-ray diffraction measurement method of measuring properties of an object to be measured (for example, an object to be measured M to be described below) based on X-ray diffraction generated by the object to be measured at an intersection position (for example, an intersection position 34 to be described below) between an incident optical axis (for example, an incident optical axis 30 to be described below) and outgoing optical axes (for example, outgoing optical axes 32a, 32b, and 32c to be described below), the X-ray diffraction measurement method including: a passage limiting member pre-arrangement step (for example, a passage limiting member pre-arrangement step S11 to be described below) of arranging a plurality of passage limiting members (for example, a first passage limiting member 26a, a second passage limiting member 26b, and a third passage limiting member 26c to be described below) formed with linear slits (for example, a first slit 24a, a second slit 24b, and a third slit 24c to be described below) through which X-rays causing the X-ray diffraction pass on a plurality of outgoing optical axes (for example, outgoing optical axes 32a, 32b, and 32c to be described below) corresponding to different diffraction angles, respectively, in a manner such that each of the slits is inclined (for example, an inclination angle $\phi$ to be described below) at least in an axial direction of the outgoing optical axis corresponding to the slit with respect to an orthogonal direction (for example, an orthogonal direction A to be described below) which is orthogonal to both the incident optical axis and the outgoing optical axis corresponding to the slit; a diffraction profile calculating step (for example, a diffraction profile calculating step S12 to be described below) of detecting the X-rays passing through the slits of the plurality of passage limiting members arranged in the passage limiting member pre-arrangement step, using a first two-dimensional detector (for example, a first two-dimensional detector 18a to be described below) arranged at a position of a low-angle peak in an X-ray diffraction peak and having a relatively narrow detection region and higher spatial resolution and a second two-dimensional detector (for example, a second two-dimensional detector 18b to be described below) arranged at a position oi a high-angle peak in the X-ray diffraction peak and having a wider detection region and lower spatial resolution, and classifying and calculating diffraction profiles indicating an X-ray intensity with respect to a diffraction angle of the object to be measured as diffraction profiles related to X-rays passing through the plurality of passage limiting members based on the two-dimensional X-ray images by the detection; an evaluating step (for example, an evaluating step S13 to be described below) of evaluating the diffraction profiles related to the X-rays passing through the plurality of passage limiting members calculated in the diffraction profile calculating step whether the profile satisfies conditions to be treated as a measurement result for diffraction angle resolution and/or spatial resolution; and an arrangement adjusting step (for example, an arrangement adjusting step S14 to be described below) of changing and adjusting the arrangement of the plurality of passage limiting members in the passage limiting member pre-arrangement step according to the evaluation result in the evaluating step.

According to the X-ray diffraction measurement apparatus of (1), the two-dimensional detectors detect the intensities of the passing X-rays passing through the slits of the plurality of passage limiting members for each of the passing X-rays, and the profile calculator calculates the diffraction profiles related to the passing X-rays for each of the passing X-rays based on the output of the detection. Thus, it is possible to obtain measurement results relating to properties of a plurality of materials having different diffraction angles at the same time.

According to the X-ray diffraction measurement apparatus of (2), the first two-dimensional detector arranged at the position of the low-angle peak in the X-ray diffraction peak has a narrower detection region and higher spatial resolution than the second two-dimensional detector arranged at the high-angle peak in the X-ray diffraction peak. Therefore, it becomes easy to identify the diffraction profile on the low angle side where the intervals between the rings of the Debye-Scherrer ring pattern are relatively close.

According to the X-ray diffraction measurement apparatus of (3), the property of the substance exhibiting the diffraction angle of the ultra-low angle is detected using the passage limiting member of the first form, while the property of the substance exhibiting a relatively wide diffraction angle is detected using the passage limiting member of the second form. Thus, it is possible to detect the diffraction profile on the low angle side where the intervals between the rings of the Debye-Scherrer ring pattern are relatively close with high spatial resolution, and to detect the diffraction profile on the wide angle side with good signal intensity at the same time.

According to the X-ray diffraction measurement apparatus of (4), the first two-dimensional detector having a relatively narrow detection region detects the intensity of the passing X-ray from the first passage limiting member corresponding to the first form. At the same time, the second two-dimensional detector having a relatively wide detection region detects the intensities of the passing x-rays from the second passage limiting member and the third passage limiting member corresponding to the second form. Thus, it is possible to utilize without waste the wide detection region of the second two-dimensional detector, and to obtain measurement results relating to properties of a plurality of materials having different diffraction angles.

According to the X-ray diffraction measurement apparatus of (5), regarding each of the first, passage limiting member, the second passage limiting member, and the third passage limiting member, the servo mechanism can adjust at least any position and/or posture of the position in the in-plane direction orthogonal to the direction of the outgoing optical axis, the position in the direction of the outgoing optical axis, and the rotational posture around the outgoing optical axis. Therefore, it is possible to appropriately adjust the positions and/or postures of the first passage limiting member, the second passage limiting member, and the third passage limiting member, and to obtain the measurement results with high accuracy and reliability.

According to the X-ray diffraction measurement apparatus of (6), the servo mechanism controls independently the positions and/or postures of the first passage limiting member, the second passage limiting member, and the third passage limiting member for each of the first passage limiting member, the second passage limiting member, and the third passage limiting member. Therefore, the position and/or posture of each of the first passage limiting member, the second passage limiting member, and the third passage limiting member can be adjusted more appropriately.

According to the X-ray diffraction measurement apparatus of (7), since each of the passage limiting members is a tungsten plate, the passage of the X-rays can be strictly limited to the regions of the slits.

According to the X-ray diffraction measurement method of (8), the diffraction profile of the passing X-ray of each of the passage limiting members at the positions arranged in the passage limiting member pre-arrangement step are calculated in the diffraction profile calculating step. Next, it is evaluated in the evaluating step whether the calculated profile satisfies the conditions to be treated as the measurement result with respect to the diffraction angle resolution and/or the spatial resolution. Further, according to the evaluation result in the evaluating step, the arrangement in the passage limiting member pre-arrangement step of each of the plurality oi passage limiting members is changed and adjusted in the arrangement adjusting step. Thus, it is possible to obtain measurement results relating to properties of a plurality of materials having different diffraction angles with high accuracy and reliability at the same time.

BRIEF DESCRIPTION OF THE DRAWINGS

FIG. 9 is a flowchart showing an X-ray diffraction measurement method according to an embodiment of the present invention;

DETAILED DESCRIPTION OF THE INVENTION

Figure 1:
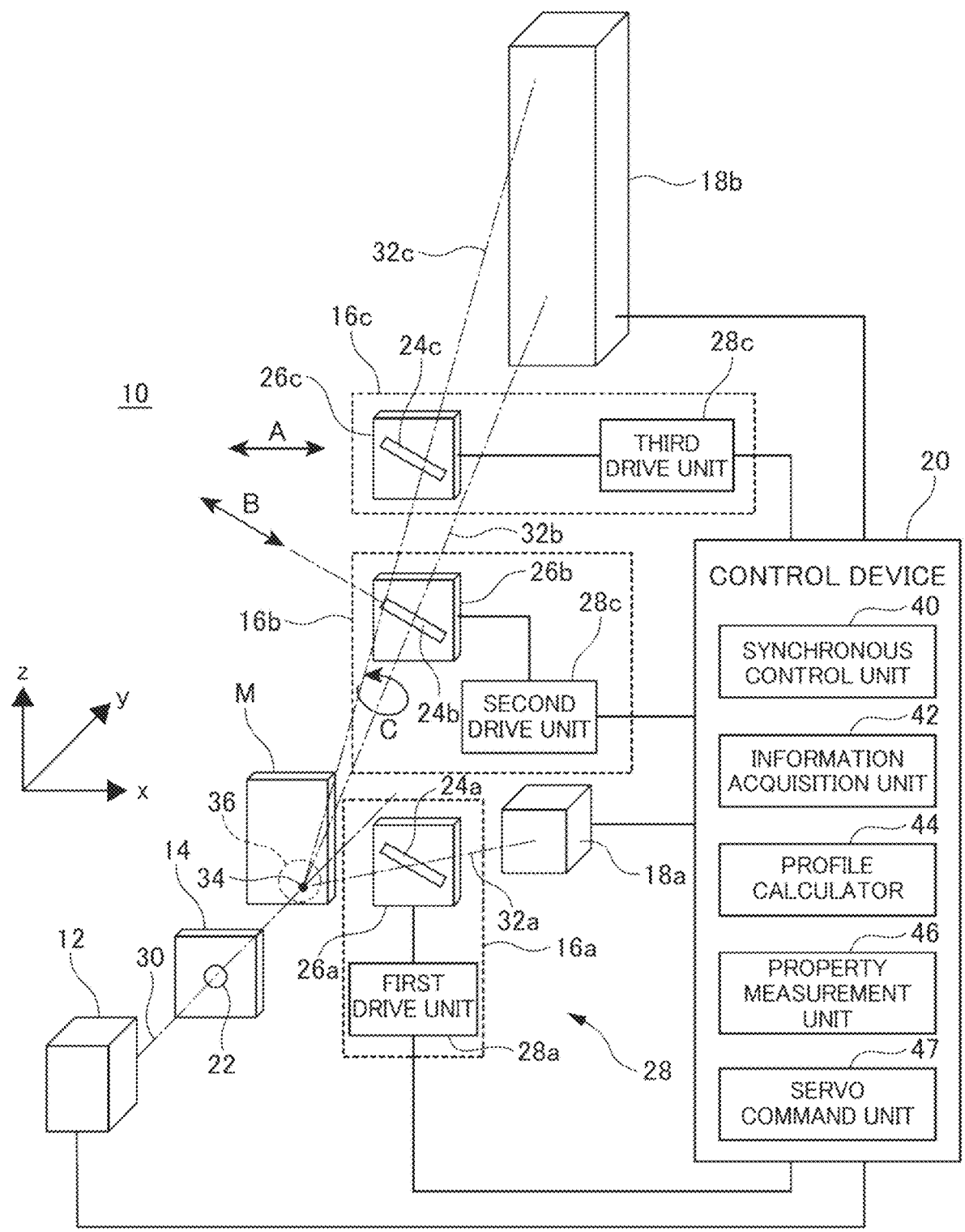
FIG. 1 is a configuration diagram of an X-ray diffraction measurement apparatus according to an embodiment of the present invention.

FIG. 1 is a configuration diagram of an X-ray diffraction measurement apparatus 10 according to an embodiment of the present invention. The X-ray diffraction measurement apparatus 10 is an apparatus adapted to measure properties of an object to be measured M, by detecting X-ray diffraction produced by the object to be measured M. In the present embodiment, an apparatus configuration is shown in which a transmission type of X-ray diffraction method is performed. However, an apparatus configuration may also be adopted which is applicable to a reflection type of X-ray diffraction method.

The X-ray diffraction measurement apparatus 10 is constituted to include an X-ray generator 12, an incident-side passage limiting mechanism 14, a first outgoing-side passage limiting mechanism 16a, a second outgoing-side passage limiting mechanism 16b, a third outgoing-side passage limiting mechanism 16c, a first two-dimensional detector 18a, a second two-dimensional detector 18b, and a control device 20. The control device 20 is constituted to include a microprocessor and a memory, and controls respective components of the X-ray diffraction measurement apparatus 10. By reading out and executing programs stored in the memory, the control device 20 functions as a synchronous control unit 40, an information acquisition unit 42, a profile calculator 44, a property measurement unit 46, and a servo command unit 47. The control device 20 is constituted to be capable of functioning the servo command unit 47 in a manual operation mode by receiving an operation from an operation unit (not shown).

The X-ray generator 12 is equipped with a thermoelectron type, a field emission type, or a Schottky type of electron gun, and radiates X-rays toward the exterior. Alternatively, the X-ray generator 12 may be an insertion light source (more specifically, an undulator or a wiggler) which is provided in various types of accelerators including a synchrotron, a storage ring, a linac, and a microtron.

The first outgoing-side passage limiting mechanism 16a, the second outgoing-side passage limiting mechanism 16b, and the third outgoing-side passage limiting mechanism 16c are mechanisms having similar configurations to each other, and the specifications thereof are different as described later.

The first outgoing-side passage limiting mechanism 16a includes a first passage limiting member 26a having a linear first slit 24a, and a first drive unit 28a that drives the first passage limiting member 26a.

The second outgoing-side passage limiting mechanism 16b includes a second passage limiting member 26b having a linear second slit 24b, and a second drive unit 28b that drives the second passage limiting member 26b.

The third outgoing-side passage limiting mechanism 16c includes a third passage limiting member 26c having a linear third slit 24c, and a third drive unit 28c that drives the third passage limiting member 26c.

The first passage limiting member 26a, the second passage limiting member 26b, and the third passage limiting member 26c may be any metal material having an atomic number larger than that of tantalum, and tungsten is a preferable plate material in consideration of price, workability and rigidity. Therefore, the passage of X-rays can be strictly limited to the regions of the first slit 24a, the second slit 24b and the third slit 24c.

Incidentally, a representative light beam, which is formed by connecting the X-ray generator 12, a pinhole 22, and the object to be measured M by a single straight line, is referred to as an "incident optical axis 30". As described above, since the first outgoing-side passage limiting mechanism 16a, the second outgoing-side passage limiting mechanism 16b, and the third outgoing-side passage limiting mechanism 16c are mechanisms having similar configurations to each other, for facilitating the description, the second outgoing-side passage limiting mechanism 16b is representatively focused on.

An outgoing optical axis 32b in the second outgoing-side passage limiting mechanism 16b intersects the incident optical axis 30 at one intersection position 34. The second slit 24b is arranged on the outgoing optical axis 32b, and is arranged so as to be inclined at least in an axial direction of the outgoing optical axis 32b with respect to an orthogonal direction (hereinafter, appropriately referred to as "orthogonal direction A") orthogonal to both the incident optical axis 30 and the outgoing optical axis 32b corresponding to the second slit. Hereinafter, the longitudinal direction of the second slit 24b is appropriately referred to as an "inclination direction B". In this manner, by arranging the object to be measured M at the intersection position 34, a diffraction profile related to passage X-rays of the second slit 24b is calculated by the second two-dimensional detector 18b and a profile calculator 44 of the control device 20.

Similarly, an outgoing optical axis 32a is defined for the first outgoing-side passage limiting mechanism 16a, and the first slit 24a is arranged on the outgoing optical axis 32a and is arranged so as to be inclined at least in an axial direction of the outgoing optical axis 32a with respect to the orthogonal direction A. By the object to be measured M arranged at the intersection position 34, a diffraction profile related to passage X-rays of the first slit 24a is calculated by the first two-dimensional detector 18a and the profile calculator 44 of the control device 20.

In addition, similarly, an outgoing optical axis 32c is defined for the third outgoing-side passage limiting mechanism 16c, and the third slit 24c is arranged on the outgoing optical axis 32c and is arranged so as to be inclined at least in an axial direction of the outgoing optical axis 32c with respect to the orthogonal direction A. By the object to be measured M arranged at the intersection position 34, a diffraction profile related to passage X-rays of the third slit 24c is calculated by the second two-dimensional detector 18b and the profile calculator 44 of the control device 20.

In this case, the second two-dimensional detector 18b classifies and respectively detects the Intensity of passage X-rays (X-ray diffraction image) of the second slit 24b, and the intensity of passage X-rays of the third slit 24c. In other words, the first two-dimensional detector 18a and the second two-dimensional detector 18b separately classify and respectively detect the intensity of the passage X-rays of the first slit 24a, the intensity of the passage X-rays of the second slit 24b, and the intensity of the passage X-rays of the third slit 24c.

In addition, the profile calculator 44 separately classifies and respectively calculates a diffraction profile related to the passage X-rays of the first slit 24a, a diffraction profile related to the passage X-rays of the second slit 24b, and a diffraction profile related to the passage X-rays of the third slit 24c.

The first two-dimensional detector 18a is a first two-dimensional detector arranged with a region including the position of a low-angle peak in the X-ray diffraction peak corresponding to the outgoing optical axis 32a as a target position. In addition, the second two-dimensional detector 18b is a second two-dimensional detector arranged with a region including the position of a high-angle peak in the X-ray diffraction peak corresponding to the outgoing optical axis 32b and the outgoing optical axis 32c as a target position. The first two-dimensional detector 18a has a narrower detection region and a higher spatial resolution than the second two-dimensional detector 18b.

In addition, the first passage limiting member 26a is a passage limiting member of a first form provided on the outgoing optical axis 32a corresponding to the diffraction angle of the ultra-low angle. The second passage limiting member 26b and the third passage limiting member 26c are passage limiting members of a second form provided corresponding to the outgoing optical axis 32b and the outgoing optical axis 32c corresponding to the wide angle diffraction angle as compared with the ultra-low angle.

The xyz coordinate system shown in FIG. 1 is an orthogonal coordinate system, in which the direction of the incident optical axis 30 is defined as a "y-axis", and in which a plane including the incident optical axis 30 and the outgoing optical axis 32b is defined as a "yz plane". In this case, both the incident optical axis 30 and the outgoing optical axis 32b are orthogonal to the "x-axis" (corresponding to the "orthogonal direction A"). The yz plane is the same for first outgoing-side passage limiting mechanism 16a and the third outgoing-side passage limiting mechanism 16c. That is, the xyz coordinate system is common to the first outgoing-side passage limiting mechanism 16a, the second outgoing-side passage limiting mechanism 16b, and the third outgoing-side passage limiting mechanism 16c.

The first passage limiting member 26a, the second passage limiting member 26b, and the third passage limiting member 26c are arranged in a manner such that at least any position and/or posture of the positions in the in-plane direction (in-plane direction in the xz plane) orthogonal to the directions of the outgoing optical axis 32a, the outgoing optical axis 32b, and the outgoing optical axis 32c corresponding to each passage limiting member, and in the directions (y-axis direction) of the outgoing optical axis 32a, the outgoing optical axis 32b, and the outgoing optical axis 32c, and the rotational postures (an inclination angle ϕ which is the inclination angle in the inclination direction B with respect to the orthogonal direction A) around the outgoing optical axis 32a, the outgoing optical axis 32b, and the outgoing optical axis 32c is adjustable.

Regarding the first passage limiting member 26a, at least any position and/or posture of the position in the in-plane direction orthogonal to the direction of the outgoing optical axis 32a and the position in the direction of the outgoing optical axis 32a, and the rotational posture around the outgoing optical axis 32a is adjusted by the first drive unit 28a that is operated by a command from the control device 20. Specifically, the first drive unit 28a is driven by the drive signal issued by the servo command unit 47 based on the calculation result of the profile calculator 44 in the control device 20, and the above-mentioned position and/or posture of the first passage limiting member 26a is adjusted.

Regarding the second passage limiting member 26b, at least any position and/or posture of the position in the in-plane direction orthogonal to the direction of the outgoing optical axis 32b and the position in the direction of the outgoing optical axis 32b, and the rotational posture around the outgoing optical axis 32b is adjusted by the second drive unit 28b that is operated by a command from the control device 20. Specifically, the second drive unit 28b is driven by the drive signal issued by the servo command unit 47 based on the calculation result of the profile calculator 44 in the control device 20, and the above-mentioned position and/or posture of the second passage limiting member 26b is adjusted.

Regarding the third passage limiting member 26c, at least any position and/or posture of the position in the in-plane direction orthogonal to the direction of the outgoing optical axis 32c and the position in the direction of the outgoing optical axis 32c, and the rotational posture around the outgoing optical axis 32c is adjusted by the third drive unit 28c that is operated by a command from the control device 20. Specifically, the third drive unit 28c is driven by the drive signal issued by the servo command unit 47 based on the calculation result of the profile calculator 44 in the control device 20, and the above-mentioned position and/or posture of the third passage limiting member 26c is adjusted.

The servo command unit 47, the first drive unit 28a, the second drive unit 28b, and the third drive unit 28c constitutes a servo mechanism 28 that adjusts the above-mentioned positions and/or postures of the first passage limiting member 26a, the second passage limiting member 26b, and the third passage limiting member 26c based on the output of the profile calculator 44. The servo mechanism 28 independently controls the above-mentioned positions and/or postures of the first passage limiting member 26a, the second passage limiting member 26b, and the third passage limiting member 26c for each of the passage limiting members 26a, 26b, and 26c.

In addition, in the operation in the above-mentioned manual operation mode, the servo command unit 47 is constituted to cause the servo mechanism 28 to function as a manual manipulator in response to the operation from the operation unit by the operator to manually adjust the above-mentioned positions and/or postures of the first passage limiting member 26a, the second passage limiting member 26b, and the third passage limiting member 26c.

Next, with reference to FIGS. 2, 3A and 3B, in the first passage limiting member 26a, the second passage limiting member 26b, and the third passage limiting member 26c, a phenomenon that attracts attention when the intensities of the passage X-rays (X-ray diffraction image) at the first slit 24a, the second slit 24b, and the third slit 24c are detected by the first two-dimensional detector 18a and the second two-dimensional detector 18b will be described. The first outgoing-side passage limiting mechanism 16a, the second outgoing-side passage limiting mechanism 16b, and the third outgoing-side passage limiting mechanism 16c corresponding to the first passage limiting member 26a, the second passage limiting member 26b, and the third passage limiting member 26c have similar configurations to each other as described above. Therefore, this phenomenon is also similar. Therefore, representatively, the case where the intensity of the passage X-rays at the second slit 24*b* of the second outgoing-side passage limiting mechanism 16*b* is detected by the second two-dimensional detector 18*b* will be described.

Figure 2:
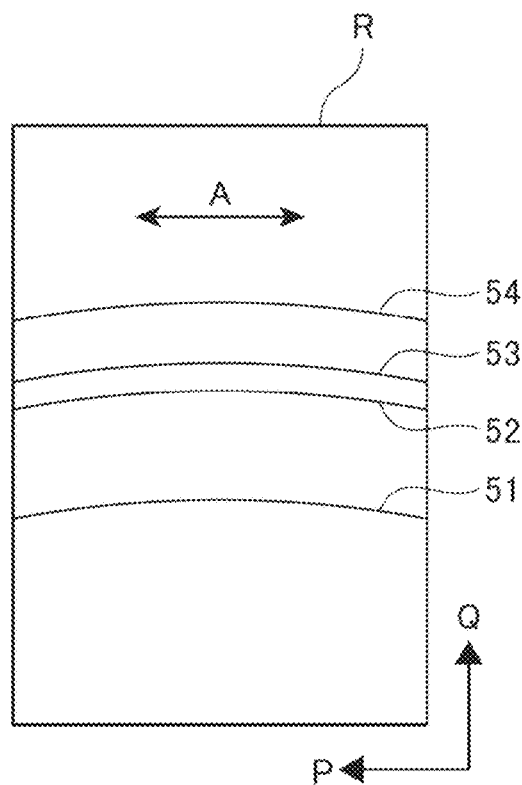
FIG. 2 is diagram showing an X-ray diffraction image of a positive electrode plate of a single layer cell.

FIG. 2 is diagram showing an X-ray diffraction image of a positive electrode plate of a single layer ceil as an object to be measured M. The diagram schematically illustrates detection results in the case that the object to be measured M is irradiated with X-rays in a state in which the passage limiting member 26*b* (FIG. 1) is removed. Hereinafter, for facilitating the description, it is assumed that optical blurring occurs to the same extent in the second two-dimensional detector 18*b*, regardless of the presence or absence of the passage limiting member 26*b*.

In FIG. 2, the rectangular region corresponds to a detection region R used for detection of the intensity of the passage X-rays (X-ray diffraction image) at the second slit 24*b* on the second two-dimensional detector 18*b* (FIG. 1). In the detection region R, positions where the detected X-ray intensity is small are indicated in white, and positions where the detected X-ray intensity is large are indicated in black. Further, in the detection region R, the short side direction thereof is defined as a P-axis, and the long side direction thereof is defined as a Q-axis, respectively. It should be noted that the P-axis direction coincides with the above-mentioned orthogonal direction A.

The positive electrode active material as the object to be measured M in the single layer cell is formed of a material having four peaks at diffraction angles lying close to each other (roughly, 25°<2θ<30 degrees). In this case, partial images of Debye-Scherrer ring pattern are simultaneously and distinguishably detected as arcuate patterns 51 to 54 extending along the orthogonal direction A within the detection region R.

As can be understood from the positional relationship shown in FIG. 1, the pattern 51 having a smaller diffraction angle has a smaller Q coordinate within the detection region R. Conversely, as the diffraction angle of the pattern 54 becomes larger, the Q coordinate increases within the detection region R.

Figure 3A:
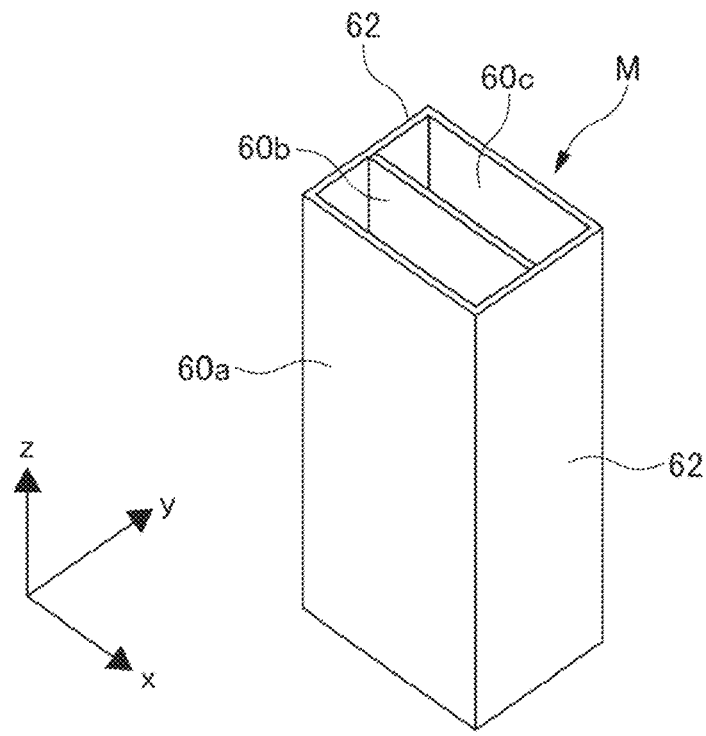
FIG. 3A is a perspective view of an object to be measured in which the structure of a lithium ion battery is simulated.

FIG. 3A is a perspective view of the object to be measured M in which the structure of a lithium ion battery is simulated. The object to be measured M is composed of three layered bodies 60*a*, 60*b*, and 60*c* corresponding to the positive electrode plate described in FIG. 2, and two fixed plates 62 and 62 or fixing the layered bodies 60*a* to 60*c* from both sides thereof.

Figure 3B:
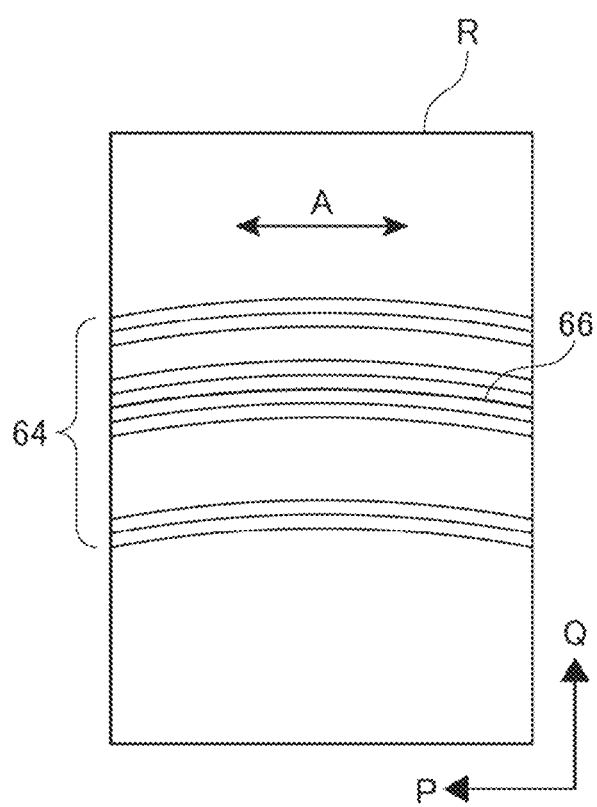
FIG. 3B is a diagram showing an X-ray diffraction image taken with the object to be measured shown in FIG. 3A.

FIG. 3B is a diagram showing an X-ray diffraction image taken with the object to be measured M shown in FIG. 3A. Similar to the case of FIG. 2, this diagram schematically illustrates detection results in the case that the object to be measured M is irradiated with X-rays in a state in which the passage limiting member 26 (FIG. 1) is removed.

As can be understood from FIG. 3B, within the detection region R, the patterns 51 to 54 (FIG. 2) in the layered bodies 60*a* to 60*c* are detected simultaneously as a linear pattern group 64 in which the patterns 51 to 54 are moved in parallel along the Q-axis direction and overlap one another. However, the pattern 53 in the layered body 60*a* on the frontmost side, and the pattern 52 in the layered body 60*c* on the rearmost side are overlapped with each other and detected. Therefore, when an overlapping portion 66 indicated by the thick line is regarded as one pattern, the linear pattern group 64 is formed substantially of eleven patterns.

That is, phenomenologically speaking, in the case that portions of the plurality of patterns 51 to 54 are overlapped in accordance with the shape or the arrangement of the object to be measured M, a problem results in that it becomes difficult to separate and discriminate the individual patterns 51 to 54 from each other. Such a phenomenological problem will be described below from a geometrical perspective.

In the case that the object to be measured M is irradiated with x-rays, the diffracted X-rays reach a two-dimensional position within the detection region R which is determined geometrically, corresponding to a combination of the diffraction position on the object to be measured M and the diffraction angle. That is, this diffraction phenomenon can be perceived and treated as a geometrical mapping problem. For example, in a measurement system in which uniqueness of mapping is preserved, combinations of the diffraction position and the diffraction angle are uniquely specified based on the X-ray detection results.

However, when attention is focused on the diffraction position (more specifically, the y coordinate) of the object to be measured M, uniqueness of mapping is not preserved in relation to the orthogonal direction A within the detection region R. Accordingly, a phenomenon occurs in which the patterns 51 to 54 partially overlap, as shown in FIG. 3B. Although a discontinuous body (made up of discrete bodies) has been described above for ease of understanding, a similar phenomenon may occur even when a continuous body having a significant thickness is used.

Generally, in the case where measurement of an object to be measured M of this type is performed, a method of detecting only X-rays at a specific diffraction position (a specific y coordinate) using a confocal optical system is used. In this case, in order to carry out measurement at each diffraction position, it is necessary to sequentially repeat the operations of "relatively moving the object to be measured M" and "radiating X-rays".

Accordingly, when the number of plots of the diffraction positions is large, a problem arises in that the time required for measurement becomes correspondingly longer. Similarly, such a problem also applies to measurement at each diffraction angle. Thus, an X-ray diffraction measurement apparatus and method is proposed in which the object to be measured M can be effectively measured by a one-time X-ray detection operation.

Figure 4:
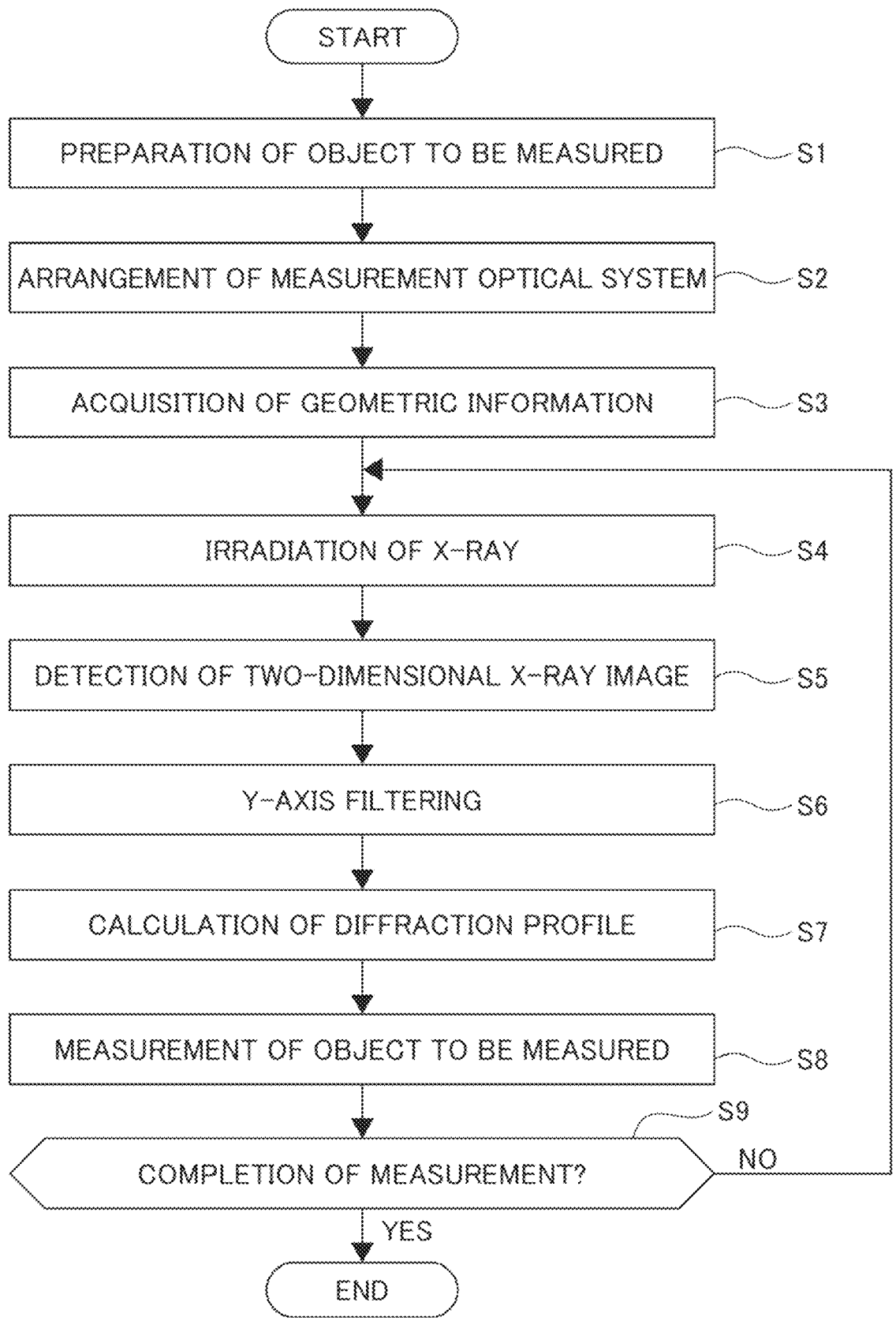
FIG. 4 is a flowchart for describing operations in the case where the X-ray diffraction measurement apparatus shown in FIG. 1 is manually operated and measurement is performed.

FIG. 4 is a flowchart showing operations in the case where the X-ray diffraction measurement apparatus 10 shown in FIG. 1 is manually operated and measurement is performed. In the description according to FIG. 4, representatively, the case where the intensity of the passage X-rays at the second slit 24*b* of the second outgoing-side passage limiting mechanism 16*b* is detected by the second two-dimensional detector 13*b* will be described.

In step S1 of FIG. 4, an operator prepares the object to be measured M, and arranges the object to be measured M at a predetermined position (the intersection position 34). The object to be measured M is an object that causes an X-ray diffraction phenomenon to be generated, that is, an object made from a polycrystalline material with orientational disorder, or an object including such a material.

For example, in the case that the object to be measured M is an object having a significant thickness (specifically, 10 μm or greater), the object is arranged at an orientation in which the thickness direction thereof lies parallel to the incident optical axis 30 (y-axis). In addition, in the case that the object to be measured M is an object in which layered bodies 60*a* to 60*c* are stacked (refer to FIG. 3A), the object is arranged at an orientation such that a stacking direction thereof lies parallel to the incident optical axis 30 (y-axis).

In step S2, the operator arranges (positionally adjusts) the measurement optical system in the X-ray diffraction measurement apparatus 10. Accordingly, the incident optical axis 30 and the outgoing optical axis 32b are adjusted so as to intersect with a predetermined intersection angle 2θ at the intersection position 34. Since the material composition of the object to be measured M is already known to the operator, the incident optical axis and the outgoing optical axis are set to an intersection angle 2θ at which X-ray diffraction can easily be detected.

In step S3, the information acquisition unit 42 acquires geometric information in relation to the optical measurement system arranged in step S2. Here, the information acquisition unit 42 acquires geometric information for the purpose of specifying a positional relationship between the intersection position 34, the second slit 24b, and the detection region R.

Figure 5A:
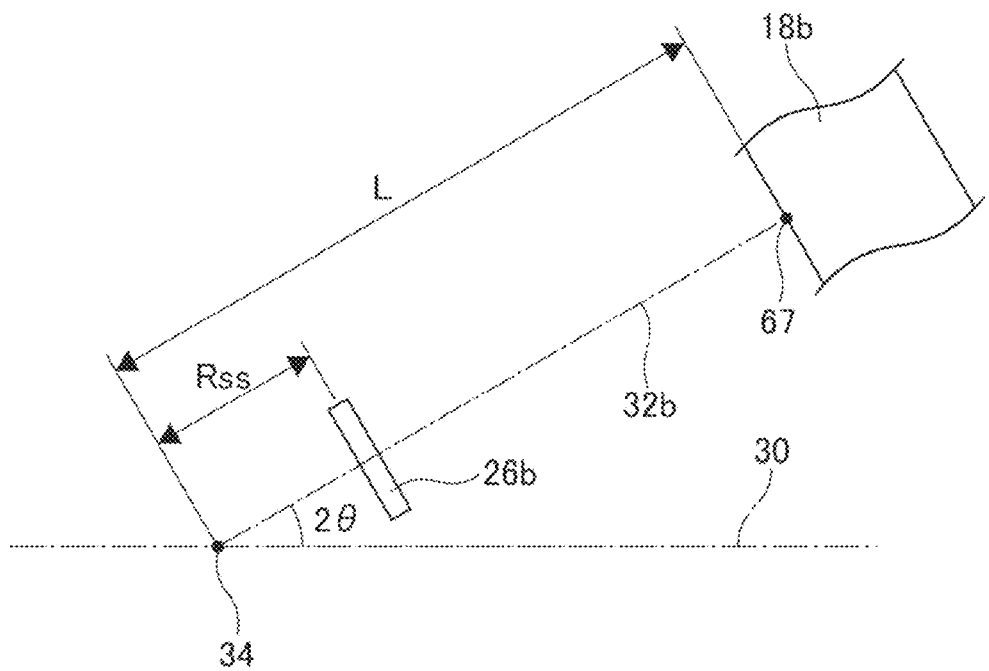
FIG. 5A is an explanatory diagram in relation to geometric information for specifying a relative positional relationship.

As shown in FIG. 5A, as geometric information for specifying the relative positional relationship, specifically, there is given, [1] the distance L from the intersection position 34 to the second two-dimensional detector 18b, [2] the distance Rss from the Intersection position 34 to the second passage limiting member 26, [3] the intersection angle 2θ formed between the incident optical axis 30 and the outgoing optical axis 32b, [4] the coordinates (P, Q) corresponding to the position 67 on the outgoing optical axis 32b, [5] the angle (in the shown example, an angle of 0 degrees) formed between a line normal to the plane of the second two-dimensional detector 18b and the outgoing optical axis 32b, and [6] the angle (in the shown example, an angle of 0 degrees) formed between a line normal to the plane of the second passage limiting member 26b and the outgoing optical axis 32b.

Figure 5B:
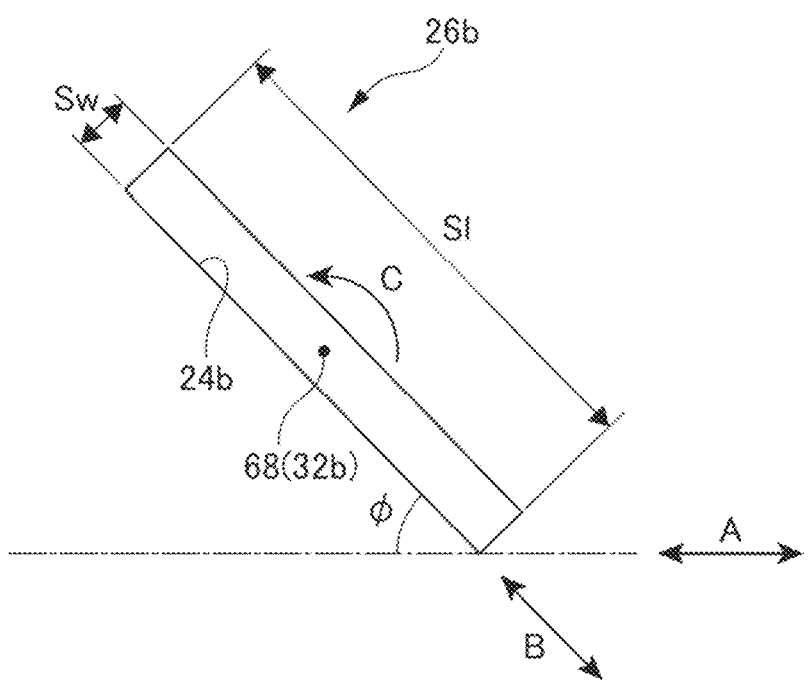
FIG. 5B is an explanatory diagram in relation to geometric information for specifying the shape of a slit.

As shown in FIG. 5B, as geometric information for specifying the shape of the second slit 24b, specifically, there is [1] the inclination angle φ (>0) of the second slit 24b, [2] the length S1 of the second slit 24b, [3] the width Sw of the second slit 24b, and [4] the amount of positional deviation between the slit center 68 and the outgoing optical axis 32b (in the shown example, the amount of positional deviation is 0).

In addition to geometric information, the information acquisition unit 42 may also acquire information concerning the shape or arrangement of the object to be measured M. As such information, specifically, there is given [1] the relative position of the object to be measured M and the intersection position 34, and [2] the thickness (in the y-axis direction) of the object to be measured M.

In step S4, the X-ray generator 12 radiates X-rays in accordance with a synchronous control performed by the synchronous control unit 40. Accordingly, the X-rays pass along the incident optical axis 30 through the pinhole 22 of the incident-side passage limiting mechanism 14, and arrive at a measurement site 36 of the object to be measured M. After being diffracted at the diffraction position (a position in the interior or on the surface) of the object to be measured M, the X-rays pass along the outgoing optical axis 32b through the second slit 24b of the second passage limiting member 26, and arrive at the detection region (R in FIG. 2) corresponding to the second two-dimensional detector 18b.

Figure 6A:
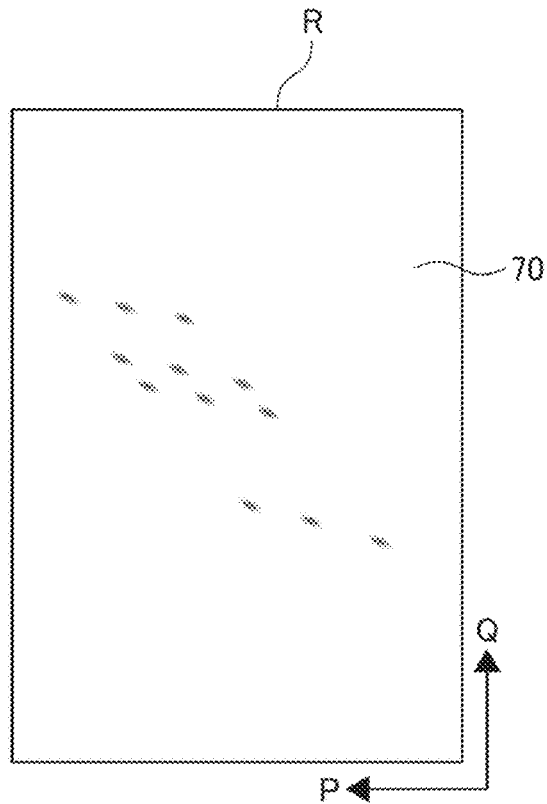
FIG. 6A is a diagram showing a two-dimensional X-ray image detected in a detecting step (step S5 of FIG. 4)
Figure 6B:
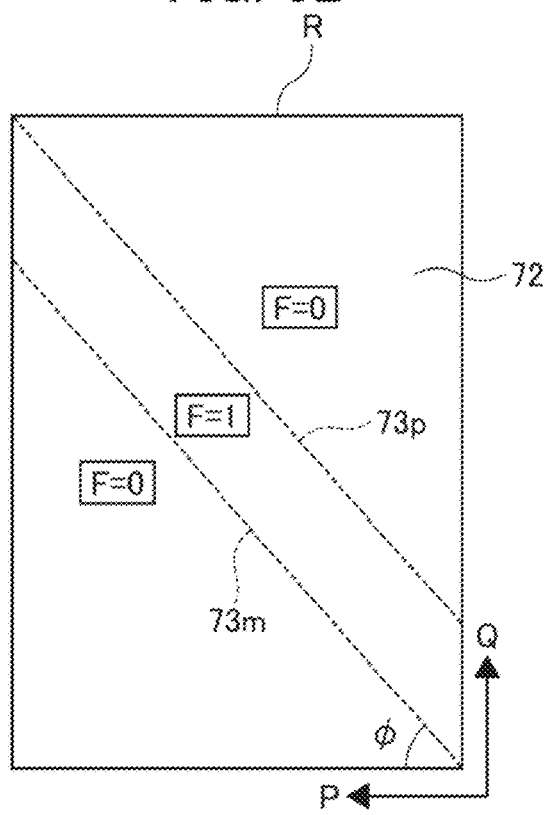
FIG. 6B is a diagram schematically showing a filter image used in a filtering step (step S6 of FIG. 4)

In step S5, in accordance with the synchronous control performed by the synchronous control unit 40, the second two-dimensional detector 18b detects the X-rays that have passed through the second slit 24b in the detection region R, and outputs an obtained detection signal to the control device 20. Thus, the control device 20 acquires a two-dimensional X-ray image 70 indicating the state of diffraction caused by the measurement site 36. The two-dimensional X-ray image 70 shown in FIG. 6A corresponds to an X-ray diffraction image produced by the object to be measured M of FIG. 3A.

In step S6, the profile calculator 44 performs a filtering process with respect to the two-dimensional X-ray image 70 acquired in step S5, so as to limit the range of (the y coordinate of) the diffraction site. Specifically, the profile calculator 44 obtains a processed X-ray image 74 by applying a binary filter image 72 with respect to the two-dimensional X-ray image 70.

Incidentally, respective boundary lines 73p and 73m are straight lines expressed by the following equation (1), using the coordinates (P, Q) of the two-dimensional position.

[Equation 1]

$$Q = P \cdot \tan\phi + \frac{L - R_{ss}}{R_{ss} - y_0 \cos 2\theta} y_0 \qquad (1)$$

The boundary line 73p is a straight line indicating a collection of detection positions of X-rays that pass through the upper edge of the second slit 24b, in the case that the diffraction angle is the intersection angle 2θ, and the diffraction position is an upper limit value (y=yo). The boundary line 73m is a straight line indicating a collection of detection positions of X-rays that pass through the lower edge of the second slit 24b, in the case that the diffraction angle is the intersection angle 2θ, and the diffraction position is a lower limit value (y=yo). Here, the either one of the boundary lines 73p and 71m is inclined at the inclination angle φ (>0) with respect to the P-axis direction (the orthogonal direction A).

For example, when the equation φ=0 is satisfied (that is, when tan φ=0), the first term on the right side of equation (1) becomes 0, and only the second term on the right side (a constant term independent of the value of P) remains. That is, in the case that there are two or more combinations of (yo, 2θ) where the values of the second terms on the right side thereof are equal, the two-dimensional positions (P, Q) corresponding to such combinations all coincide.

On the other hand, as shown in FIG. 1, when the inequality φ>0 is satisfied, the first term on the right side of equation (1) becomes non-zero, and therefore, Q assumes a value that depends on the value of P. Since the values of P corresponding to the combinations of (yo, 2θ) differ from each other, even when there are two or more combinations of (yo, 2θ) in which the constant terms thereof are equal, the two-dimensional positions (P, Q) differ from each other.

The profile calculator 44 multiplies the detection values (that is, the pixel values) of each pixel forming the two-dimensional X-ray image 70 by the binary filter coefficient F corresponding to the position oi the pixel, and thereby carries out a filtering process on the diffraction positions. For example, in relation to the object to be measured M shown in FIG. 3A, in the case that the range of the diffraction positions (y coordinates) is set so as to include all of the layered bodies 60a to 60c, the processed X-ray image 74 shown in FIG. 6C is obtained.

Figure 6C:
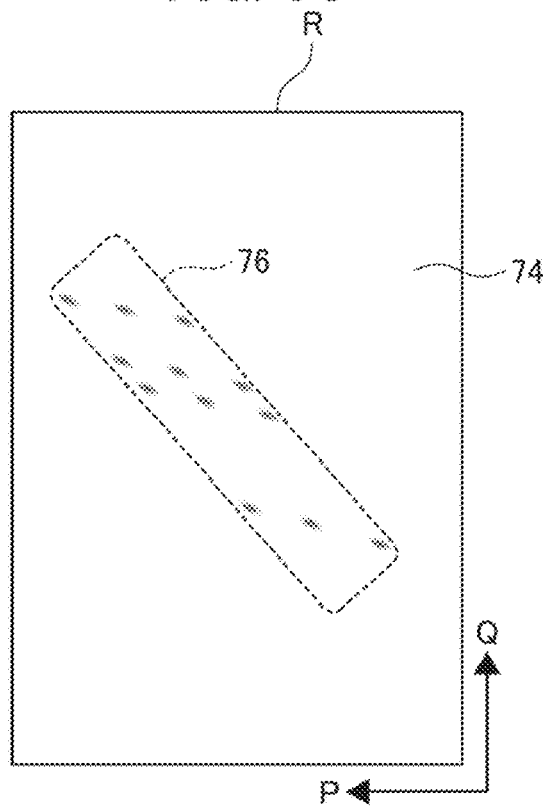
FIG. 6C is a view showing a result in which the filter image of FIG. 6B is applied with respect to the two-dimensional X-ray image of FIG. 6A.

As shown in FIG. 6C, the processed X-ray image 74 includes a dotted pattern group 76 composed of twelve individually identifiable dot-like patterns. The dotted pattern group 76 corresponds to a pattern group in which the patterns 51 to 54 (refer to FIG. 2) in the layered bodies 60a to 60c (refer to FIG. 3A) are cut out in the inclination direction B of the second slit 24b.

In step S7, the profile calculator 44 calculates diffraction profiles for each of the diffraction positions using the processed X-ray image 74 filtered in step S6. Here, the term "diffraction profile" implies a characteristic curve indicating the X-ray intensity with respect to the diffraction angle (2θobs) of the object to be measured M.

Figure 7A:
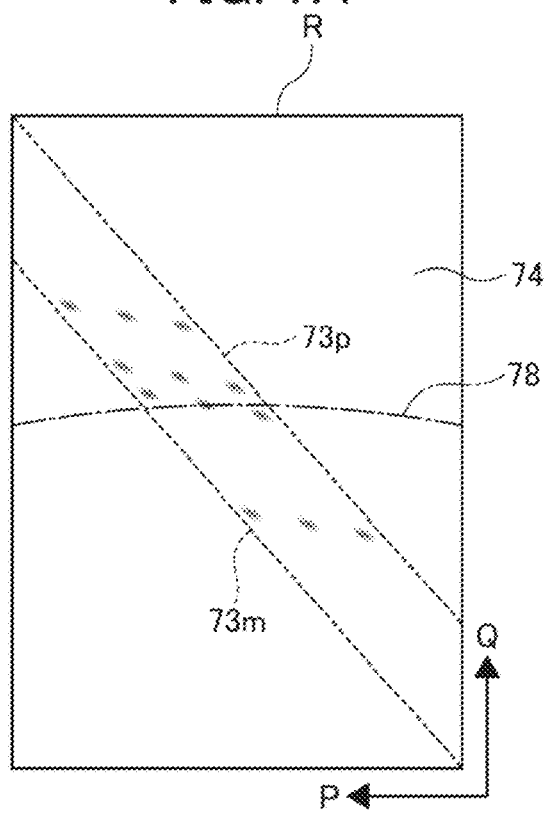
FIG. 7A is an explanatory diagram in relation to a method of calculating a diffraction profile in a calculating step (step S7 of FIG. 4)

As shown in FIG. 7A, using the above-mentioned geometric information, the profile calculator 44 calculates the projected positions of the diffracted X-rays corresponding to the specified values of (yo, 2θobs), and specifically, calculates a conic curve 78 corresponding to the projected positions of a Debye-Scherrer ring pattern expressed in the form of an elliptical curve. Then, the profile calculator 44 obtains the X-ray intensities at specified values of (yo, 2θobs) by sequentially integrating the pixel values of all of the pixels on the conic curve 78.

In addition, in the processed X-ray image 74, In accordance with the above-described filtering process, integration is valid only for pixels (non-zero pixel values) between the boundary lines 73p and 73m, and in relation to pixels apart therefrom (zero pixel values), integration thereof is rendered substantially invalid.

For example, the profile calculator 44 is capable of calculating diffraction profiles for each of the diffraction positions (y) by fixing the diffraction position y=yo, and then sequentially determining the X-ray intensities while changing the diffraction angle 2θobs at an arbitrary step width.

Figure 7B:
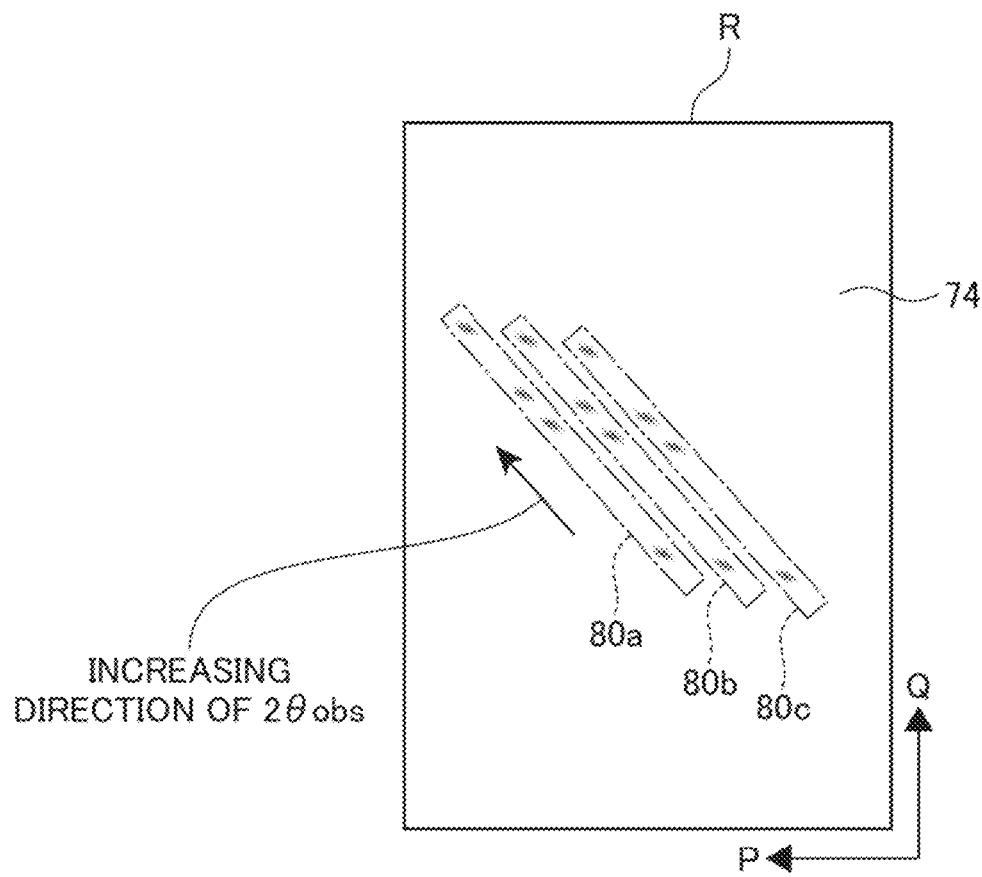
FIG. 7B is an explanatory diagram in relation to the method of calculating a diffraction profile in the calculating step (step S7 of FIG. 4)

As shown in FIG. 7B, one-dimensional X-ray images 80a to 80c are images corresponding to the positions of the layered bodies 60a to 60c which are extracted from the two-dimensional X-ray image 70 in the inclination direction B of the second slit 24b. The arrow shown in the drawing indicates an increasing direction of the diffraction angle 2θobs. Moreover, the diffraction angle 2θobs has a non-linear correspondence relationship with respect to the position in the inclination direction B.

Figure 8A:
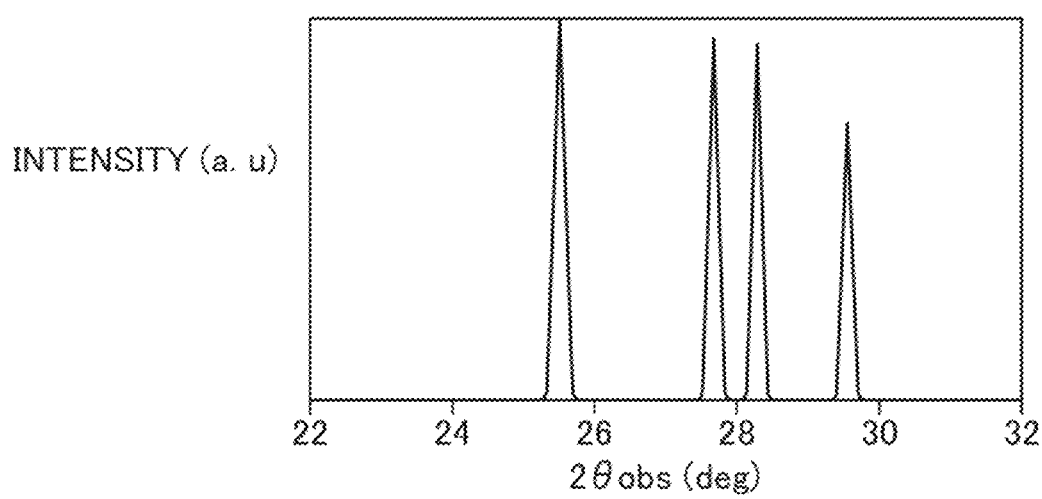
FIG. 8A is a diagram showing diffraction profiles for each of respective positions of a layered body.
Figure 8B:
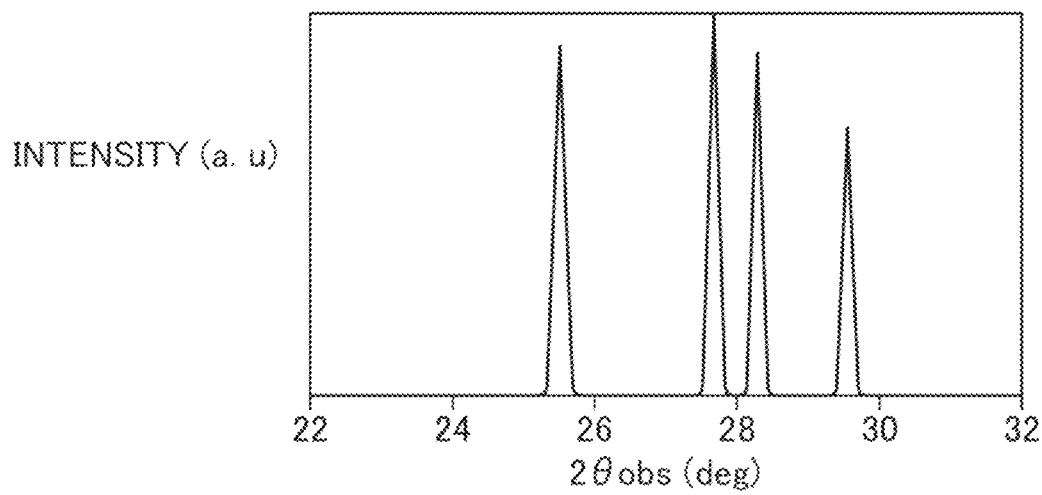
FIG. 8B is a diagram showing diffraction profiles for each of respective positions of a layered body.
Figure 8C:
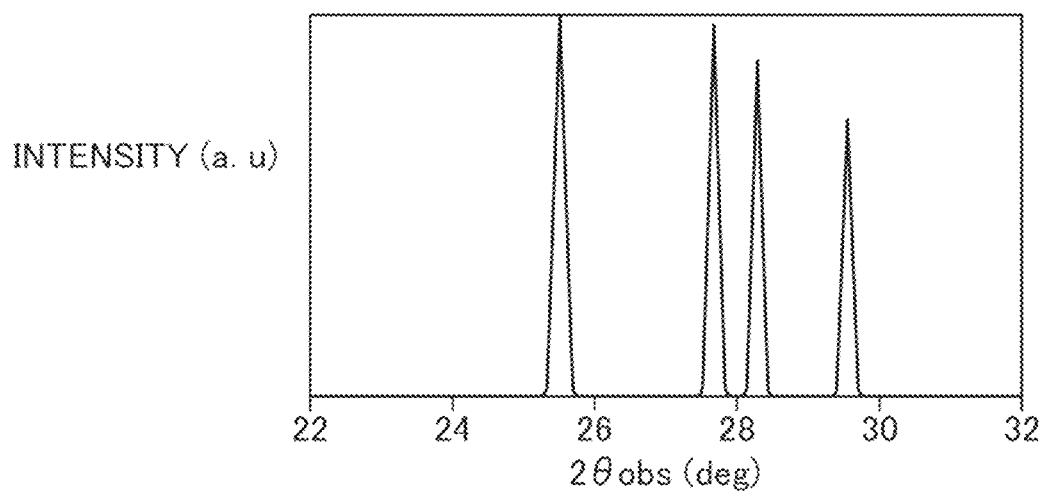
FIG. 8C is a diagram showing diffraction profiles for each of respective positions of a layered body.

FIGS. 8A to 3C are diagrams showing diffraction profiles for each of the positions of the layered bodies 60a to 60c. Each of the graphs shows the X-ray intensity (units: arbitrary) with respect to the diffraction angle 2θobs (units: degrees) of the object to be measured M. As can be understood from the drawings, although the magnitude relationship of the peak intensities differ in each of the graphs, diffraction profiles each having four peaks at the same diffraction angles 2θobs are obtained.

The magnitude relationship of the peak intensities is considered to vary for the following reasons, [1] because the area of the detection region R is of a finite size, and the detected length of the Debye-Scherrer ring pattern differs depending on the diffraction angle 2θobs, and [2] because there is a certain amount of crystal orientation in the material contained within the object to be measured M. In the case that it is desired to understand the relative magnitude relationship of the peak intensity in the same diffraction profile (as a specific example, in the case that information concerning the peak angles is extracted), there is no need to consider variations in the absolute values of the peak intensities.

In this manner, using the geometric information in relation to the Intersection position 34, the second slit 24b, and the detection region R, the profile calculator 44 calculates one or a plurality of diffraction profiles corresponding to the diffraction positions (y coordinates) of the object to be measured M. Since the second slit 24b is a linear slit, diffraction profiles corresponding to respective diffraction positions can be calculated using a comparatively simple geometric calculation.

Here, the object to be measured M may be a polycrystalline material with orientational disorder having a thickness of 10 μm or greater. By arranging the object to be measured M in a suitable orientation, as already described in step S2 of FIG. 4, properties at each of the respective positions in the thickness direction can be measured simultaneously by a one-time X-ray detection operation.

Alternatively, the object to be measured M may be an object in which the layered bodies 60a to 60c including a polycrystalline material with orientational disorder are stacked. By arranging the object to be measured M in a suitable orientation, as already described in step S2 of FIG. 4, properties at each of the respective layered bodies 60a to 60c can be measured simultaneously by a one-time X-ray detection operation.

In step S8, the property measurement unit 46 measures the properties of the object to be measured M using the diffraction profile calculated in step S7. The properties may include, for example, a diffraction intensity, a lattice spacing, a lattice constant, a Miller index, the names of identified substances, concentration, stress, and temperature of the substances, and a charge/discharge depth of a battery active material.

In step S9, the control device 20 determines whether or not an indication of completion of measurement is received. When a completion indication is not received (step S9: NO), the process returns to step S4, and steps S4 to S9 are sequentially repeated. On the ether hand, when an indication of completion of measurement is received (step S9: YES), measurement of the object to be measured M is brought to an end.

In the case that the second two-dimensional detector 18b is a photon counting type of detector, in a state in which the object to be measured M, the passage limiting member 26b, and the second two-dimensional detector 18b are fixed, the profile calculator 44 is capable of calculating a time series of diffraction profiles based on the two-dimensional X-ray images 70 sequentially detected by the second two-dimensional detector 18b. Accordingly, the properties of the object to be measured M con be measured in time series, and a so-called dynamic analysis can be performed.

As described above, with reference to FIGS. 2 to 8C, representatively, the case where the intensity of the passage X-rays at the second slit 24b of the second outgoing-side passage limiting mechanism 16b is detected by the second two-dimensional detector 18b to calculate the diffraction profile has been described. Regarding the third outgoing-side passage limiting mechanism 16c having a configuration similar to that of the second outgoing-side passage limiting mechanism 16b, the case where the intensity of the passage X-rays at the third slit 24c is detected by the second two-dimensional detector 18b to calculate the diffraction profile can be similarly described.

In addition, in the case where the intensity of the passage X-rays at the second slit 24b is detected and the case where the intensity of the passage X-rays at the third slit 24c is detected, the detection region R in the single second two-dimensional detector 18b is classified and used. In other words, for a plurality of objects to be measured having different properties and different X-ray diffraction peaks, a relatively wide detection region in the same second two-dimensional detector 18b is classified and used without waste. Accordingly, with a simple configuration, X-ray diffraction measurement can be performed on a plurality of types of objects to be measured.

The first outgoing-side passage limiting mechanism 16a having a configuration similar to that of the second outgoing-side passage limiting mechanism 16b can be described in the same manner as described above even in the case where the intensity of the passage X-rays at the first slit 24a is detected by the first two-dimensional detector 18a to calculate the diffraction profile.

Next, an X-ray diffraction measurement method according to the embodiment of the present invention will be described below with reference to FIG. 9. Through the description of the X-ray diffraction measurement method, the operation of the X-ray diffraction measurement apparatus as the embodiment of the present invention having the configuration described with reference to FIG. 1 will also be clarified.

FIG. 9 is a flowchart showing an X-ray diffraction measurement method according to an embodiment of the present invention. It is premised that object to be measured M is arranged in advance at a predetermined position (intersection position 34) as in step S1 of FIG. 4. First, in a passage limiting member pre-arrangement step S11, the first passage limiting member 26a (first slit 24a) of the first outgoing-side passage limiting mechanism 16a, the second passage limiting member 26b (second slit 24b) of the second outgoing-side passage limiting mechanism 16b, and the third passage limiting member 26c (third slit 24c) of the third outgoing-side passage limiting mechanism 16c are arranged at each corresponding position approximately predicted for the object to be measured M.

In this arrangement, the operator operates the control device 20 from an operation unit (not shown) to cause the servo mechanism 28 to function as a manual manipulator, and may set the positions and/or the postures described above of the first slit 24a, the second slit 24b, and the third slit 24c to be in a certain specific state by the first drive unit 28a, second drive unit 28b, and the third drive unit 28c.

Alternatively, when the operator performs an operation on the control device 20 from the operation unit (not shown) to designate a category that is known to correspond to the object to be measured M or is expected to correspond to the object to be measured M, the servo mechanism 28 functions as an automatic manipulator to bring the above-described positions and/or postures of the first slit 24a, the second slit 24b, and the third slit 24c into the above-described specific state.

Also in the passage limiting member pre-arrangement step S11, the first slit 24a having a relatively narrow width is arranged to match the position of the first two-dimensional detector 18a arranged at the position of the low-angle peak in the X-ray diffraction peak. Further, the second slit 24b and the third slit 24c are arranged to match the position of the second two-dimensional detector 18b arranged at the position of the high-angle peak in the X-ray diffraction peak.

The first two-dimensional detector 18a has a narrower detection region and higher spatial resolution than the second two-dimensional detector 18b. Therefore, it becomes easy to identify the diffraction profile on the low angle side where the intervals between the rings of the Debye-Scherrer ring pattern are relatively close.

The second two-dimensional detector 18b has a relatively wide detection region but low spatial resolution. However, since the second two-dimensional detector 18b is arranged at the position of the high-angle peak in the X-ray diffraction peak, the rings of the Debye-Scherrer ring pattern may be thick and the intervals between the rings may be relatively wide. Therefore, the second two-dimensional detector 18b tends to be able to detect the X-ray intensity even when the spatial resolution is low.

Next, in a diffraction profile calculating step S12, the profile calculator 44 calculates diffraction profiles related to the passing X-rays of the first slit 24a, the second slit 24b, and the third slit 24c in the arrangement provisionally set in the passage limiting member pre-arrangement step S11 for each of the passing X-rays. The calculation is generally executed sequentially or in parallel for each of the passing X-rays of the first slit 24a, the second slit 24b, and the third slit 24c as shown in S3 to S7 in FIG. 4. However, when the servo mechanism 28 functions as the automatic manipulator and the above-described positions and/or postures of the first slit 24a, the second slit 24b, and the third slit 24c are set to a predetermined specific state in the diffraction profile calculating step S12, the geometric information in S3 of FIG. 4 is known, and accordingly, the process corresponding to step S3 is omitted.

Next, in an evaluating step S13, the profile calculator 44 evaluates the diffraction profiles related to the passing X-rays of the first slit 24a, the second slit 24b, and the third slit 24c calculated in the diffraction profile calculating step S12. The evaluation evaluates whether data calculated in the diffraction profile calculating step S12 is appropriate to satisfy the conditions to be treated as a measurement result. Viewpoints of the evaluation are diffraction angle resolution, spatial resolution, and an observable diffraction angle range.

Data of the diffraction profiles related to the passing X-rays of the first slit 24a, the second slit 24b, and the third slit 24c in the arrangement provisionally set in the passage limiting member pre-arrangement step S11 are rarely appropriate as a measurement result. When it is evaluated in the evaluating step S13 that the data calculated in the diffraction profile calculating step S12 is not appropriate as a measurement result, the process proceeds to an arrangement adjusting step S14.

In the arrangement adjusting step S14, the profile calculator 44 outputs data related to adjustment of the arrangement of the first slit 24a, the second slit 24b, and the third slit 24c in order to make the evaluation result more appropriate. The servo command unit 47 receives data related to the above-described adjustment of the arrangement from the profile calculator 44, and operates the servo mechanism 28 based on the data.

As described above, the servo mechanism 28 controls independently the above-described positions and/or postures related to the first passage limiting member 26a, the second passage limiting member 26b, and the third passage limiting member 26c for each of the passage limiting members 26a, 26b, and 26c. In other words, the servo mechanism 28 independently controls the above-described positions and/or postures of the first slit 24a, the second slit 24b, and the third slit 24c.

The diffraction profile calculating step S12, the evaluating step S13, and the arrangement adjusting step S14 are repeatedly executed until the evaluation is obtained that the measurement result is appropriate in the evaluating step S13. When the evaluation is obtained that the measurement result is appropriate in the evaluating step S13, the process proceeds to a diffraction profile storing step S15. In the diffraction profile storing step S15, the profile calculator 44 stores the data calculated in the diffraction profile calculating step S12 in a predetermined memory.

In the X-ray diffraction measurement apparatus 10 according to the embodiment shown in FIG. 1, the servo mechanism 28 is configured in a manner such that the first drive unit 28a adjusts the first passage limiting member 26a, for example, the position of the in-plane direction (the in-plane direction of an xz plane) orthogonal to the direction of the outgoing optical axis 32a, the position in the direction of the outgoing optical axis 32a (a y-axis direction), and the rotational posture around the outgoing optical axis 32a (the inclination angle φ which is an inclination angle in the inclination direction B with respect to the orthogonal direction A), using the drive signal issued by the servo command unit 47.

Similarly, the servo mechanism 28 is configured in a manner such that the second drive unit 28b adjusts the second passage limiting member 26b, for example, the position of the in-plane direction (the in-plane direction of an xz plane) orthogonal to the direction of the outgoing optical axis 32b, the position in the direction of the outgoing optical axis 32b (the y-axis direction), and the rotational posture around the outgoing optical axis 32b (the inclination angle φ which is an inclination angle in the inclination direction B with respect to the orthogonal direction A), using the drive signal issued by the servo command unit 47.

Further, the servo mechanism 28 is configured In a manner such that the third drive unit 28c adjusts the third passage limiting member 26c, for example, the position of the in-plane direction (the in-plane direction of an xz plane) orthogonal to the direction of the outgoing optical axis 32c, the position in the direction of the outgoing optical axis 32c (the y-axis direction), and the rotational posture around the outgoing optical axis 32c (the inclination angle φ which is an inclination angle in the inclination direction B with respect to the orthogonal direction A), using the drive signal issued by the servo command unit 47.

The above-described adjustment of the position in the in-plane direction of the xz plane, the position in the y-axis direction, and the inclination angle φ with respect to each of the first passage limiting member 26a, the second passage limiting member 26b, and the third passage limiting member 26c by the servo mechanism 28 means adjustment of the position in the in-plane direction of the xz plane, the position in the y-axis direction, and the inclination angle φ with respect to each of the first slit 24a, the second slit 24b, and the third slit 24c.

The inventors have set a model sample to perform simulation on a relationship between the position in the in-plane direction of the xz plane, the position in the y-axis direction (appropriately referred to as a y-coordinate direction), and the inclination angle φ with respect to each of the first silt 24a, the second slit 24b, and the third slit 24c and detection outputs obtained by a first detector 18a and a second detector 18b.

Figure 10:
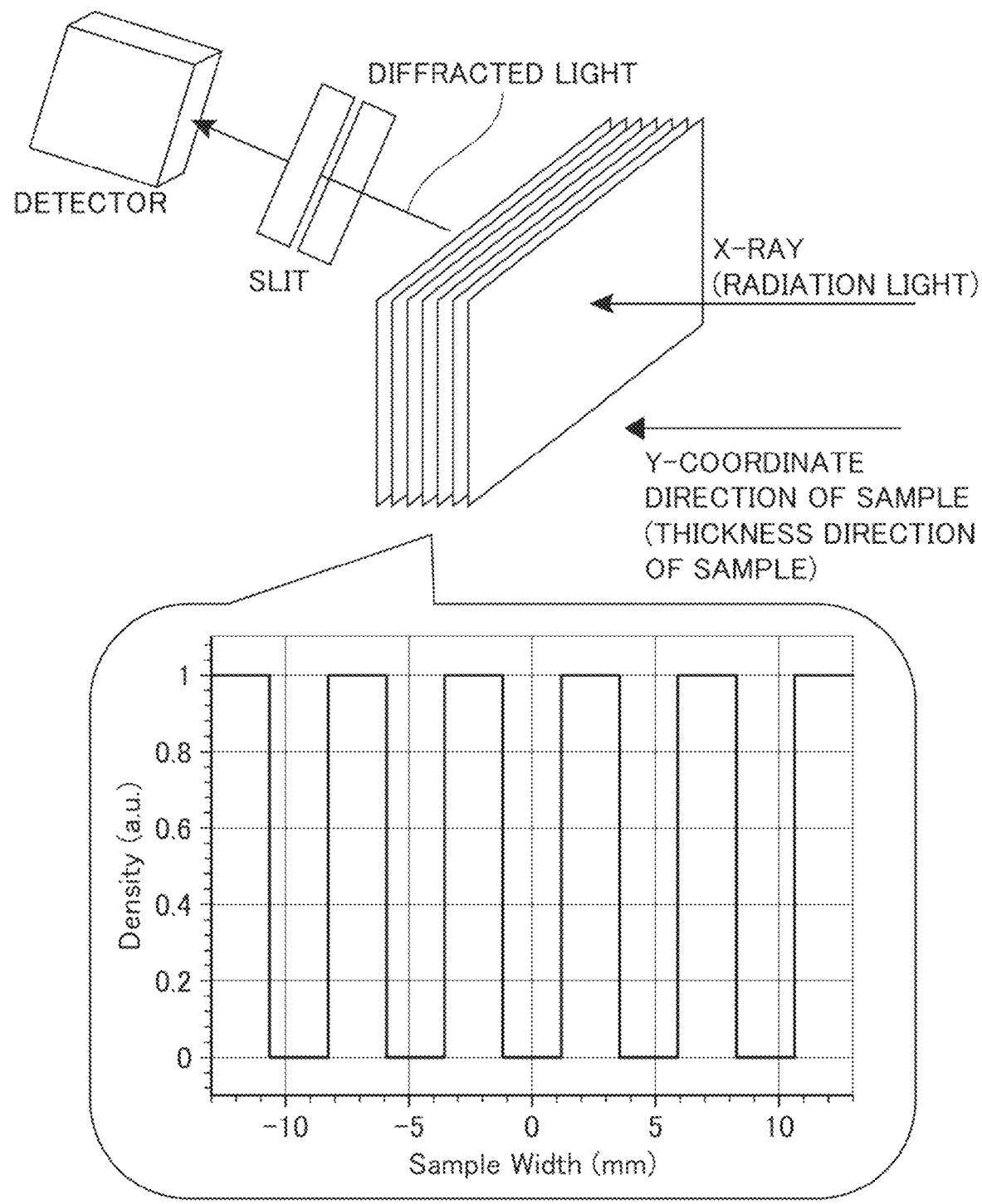
FIG. 10 is a diagram for explaining the conditions of the measurement simulation with the X-ray diffraction measurement apparatus and method according to the embodiments of the present invention.

FIG. 10 is a view illustrating conditions for simulation of measurement according to the X-ray diffraction measurement apparatus and method according to the embodiment of the present invention. Under the conditions in FIG. 10, it is assumed that six positive electrode plates ($LiCoO_2$) of a cell having a thickness of 2.36 mm are arranged at intervals of 2.36 mm in the y-coordinate direction, as model samples. A lower part in FIG. 10 shows distribution of density (1,0 depending on the presence or absence of the positive electrode plate) in the thickness direction (y-coordinate direction) of the positive electrode plate of the cell.

Figure 11A:
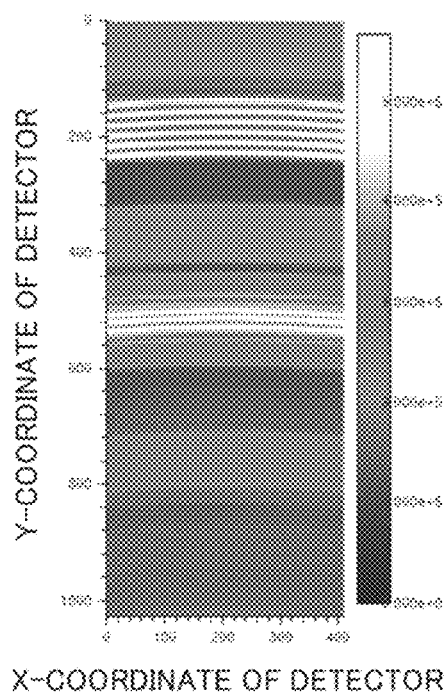
FIG. 11A is a diagram showing the output result of a detector in the case assuming that a passage limiting member is removed in the simulation of FIG. 10.

FIG. 11A is a view showing an output result of the detector when it is assumed that the passage limiting member is removed in the simulation of FIG. 10. The Debye-Scherrer ring patterns due to diffracted waves on a crystal planes of six positive electrode materials misaligned in the y-coordinate direction of the sample (sample thickness direction) overlap, and thus it looks like that analysis cannot be made whether which waveform indicates any plane of the positive electrode crystal.

Figure 11B:
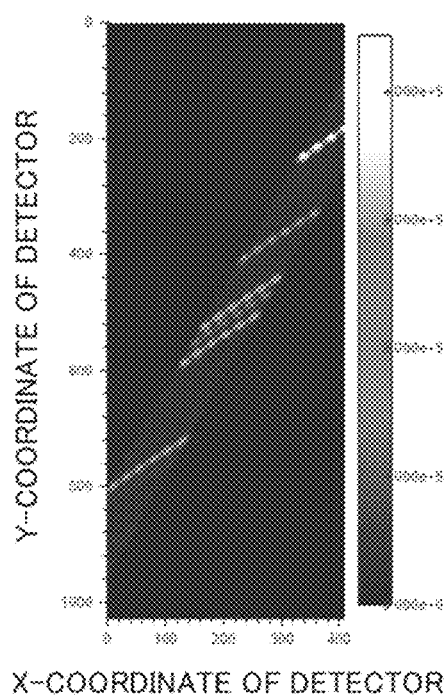
FIG. 11B is a diagram showing the output result of the detector in the case where a passage limiting member is used in the simulation of FIG. 10.
Figure 12A:
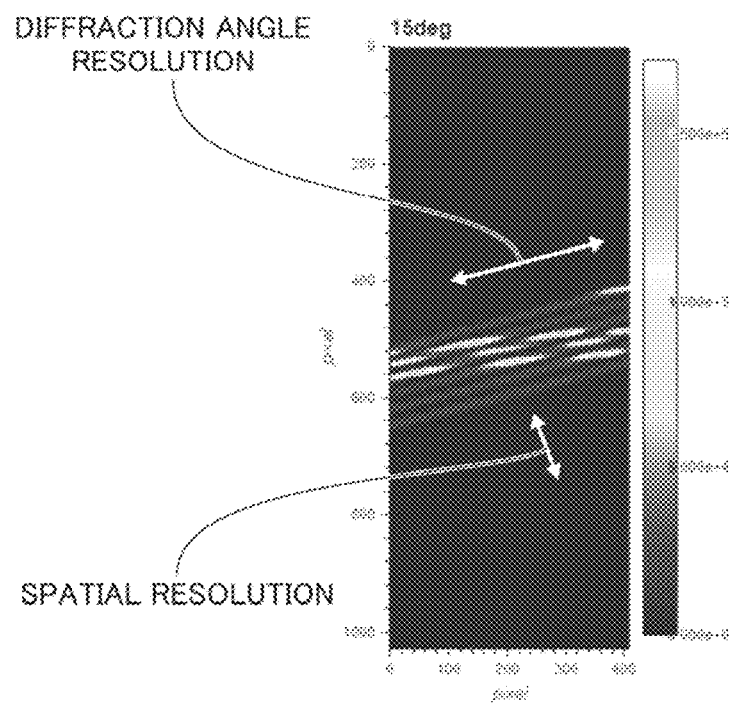
FIG. 12A is a diagram showing the output result of the detector in the case where the width of the slit of the passage limiting member is set to a predetermined value and the inclination angle of the slit is changed in the simulation of FIG. 10.
Figure 12B:
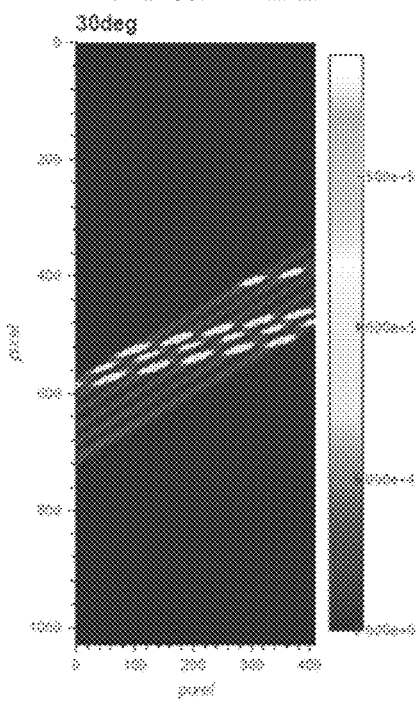
FIG. 12B is a diagram showing the output result of the detector in the case where the width of the slit of the passage limiting member is set to a predetermined value and the inclination angle of the slit is changed in the simulation of FIG. 10.
Figure 12C:
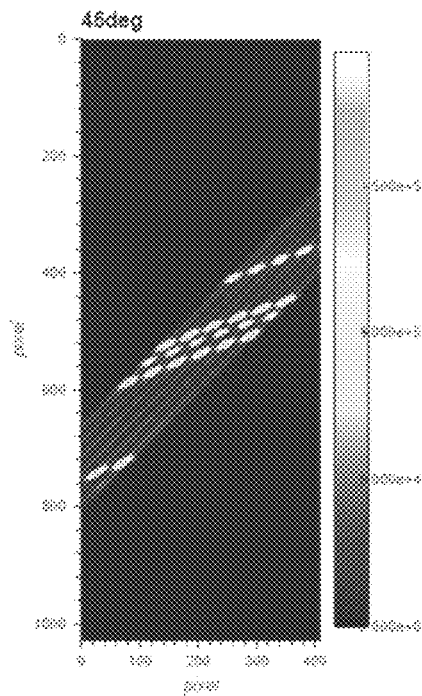
FIG. 12C is a diagram showing the output result of the detector in the case where the width of the slit of the passage limiting member is set to a predetermined value and the inclination angle of the slit is changed in the simulation of FIG. 10.
Figure 12D:
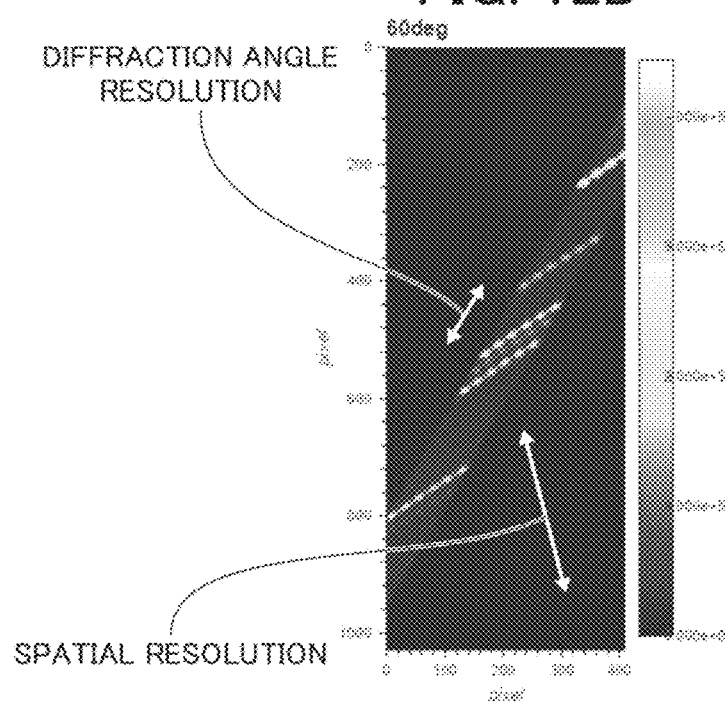
FIG. 12D is a diagram showing the output result of the detector in the case where the width of the slit of the passage limiting member is set to a predetermined value and the inclination angle of the slit is changed in the simulation of FIG. 10.
Figure 13A:
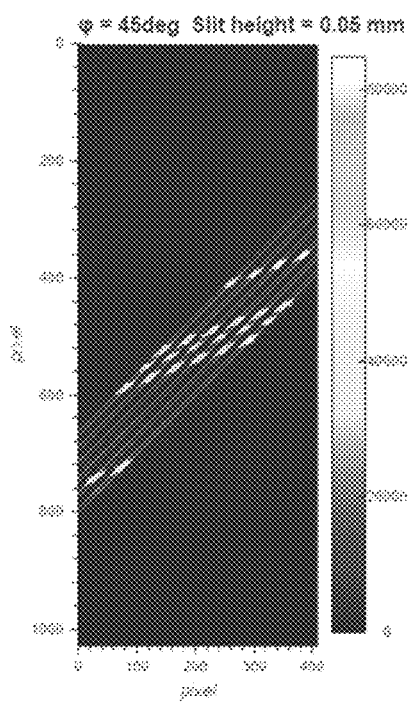
FIG. 13A is a diagram showing the output result of the detector in the case where the inclination angle of the slit of the passage limiting member is set; to a predetermined value and the height of the opening portion of the slit is changed in the simulation of FIG. 10.
Figure 13B:
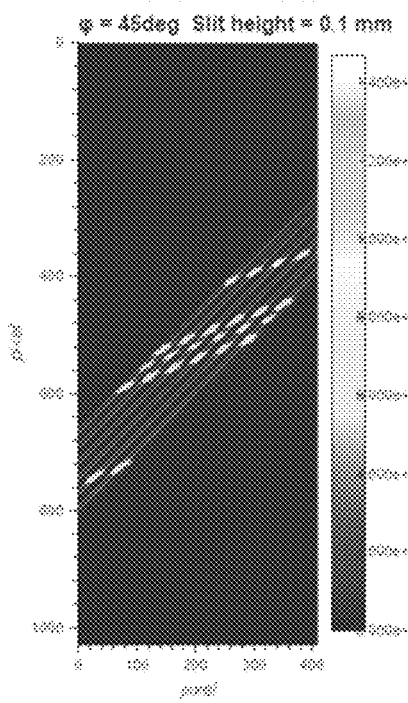
FIG. 13B is a diagram showing the output result of the detector in the case where the inclination angle of the slit of the passage limiting member is set to a predetermined value and the height of the opening portion of the slit is changed in the simulation of FIG. 10.
Figure 13C:
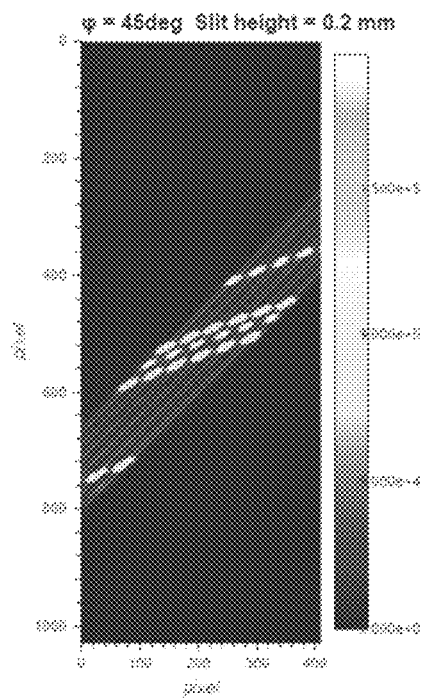
FIG. 13C is a diagram showing the output result of the detector in the case where the inclination angle of the slit of the passage limiting member is set to a predetermined value and the height of the opening portion of the slit is changed in the simulation of FIG. 10.
Figure 13D:
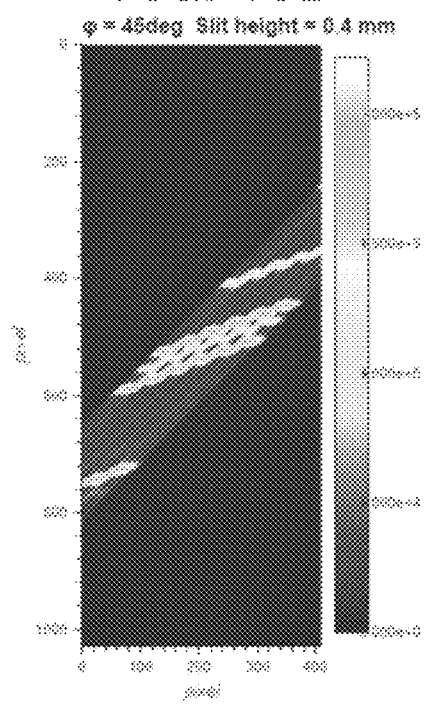
FIG. 13D is a diagram showing the output result of the detector in the case where the inclination angle of the slit of the passage limiting member is set to a predetermined value and the height of the opening portion of the slit is changed in the simulation of FIG. 10.
Figure 13E:
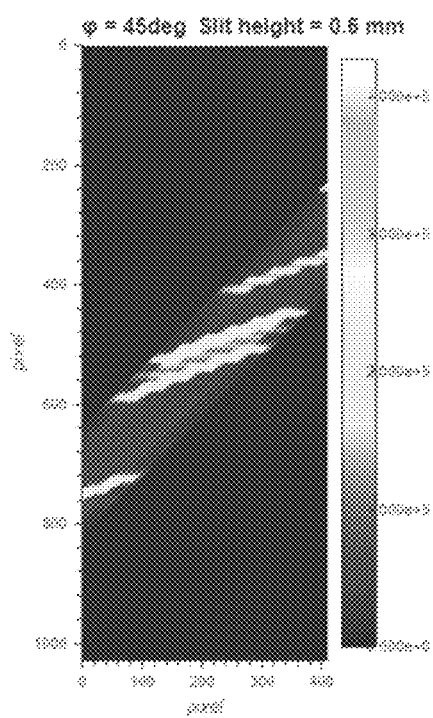
FIG. 13E is a diagram showing the output result of the detector in the case where the inclination angle of the slit of the passage limiting member is set to a predetermined value and the height of the opening portion of the slit is changed in the simulation of FIG. 10.

FIG. 11B is a view showing an output result of the detector when it is assumed that the passage limiting member is used in the simulation of FIG. 10. When diffracted light passes through the slit, the diffracted light from the y-coordinate of a certain sample reaches only on a limited straight line, so that an output result can be obtained in which information of each unit as shown in the drawings is separated. From the incident light wavelength, the camera length (distance between the sample and the detector), and the sample position, it becomes an analysis-enabled state in which each spot indicates any surface of any sample.

FIGS. 12A to 12D are diagrams showing output results of the detector in the case where the width of the slit of the passage limiting member is set to a predetermined value and the inclination angle of the slit is changed in the simulation of FIG. 10. Specifically, FIGS. 12A to 12D are diagrams showing output results of the detector when the width of the slit 0.2 mm and the inclination angle φ of the slit is changed from 15 degrees to 60 degrees. When the inclination angle φ of the slit is large, the spatial resolution is improved, but angular resolution is lowered. On the other hand, when the inclination angle φ of the slit is small, the angular resolution is improved, but the spatial resolution is lowered. The observable diffraction angle range becomes wider as the inclination angle φ increases, but this comes at the expense of diffraction angle resolution. The inclination angle φ is set in consideration of the balance of angular resolution, spatial resolution, and diffraction angle range.

FIGS. 13A to 13E are diagrams showing output result of the detector in the case where the inclination angle of the slit of the passage limiting member is set to a predetermined value and the height of an opening portion of the slit is changed in the simulation of FIG. 10. As the height of the opening portion of the slit becomes smaller, both of the spatial resolution and the diffraction angle resolution become better, but signal intensity becomes weak. The electrode plates separated by 2 mm can be separated with a slit width of 0.4 mm or less. The slit width is preferably set to 0.2 mm in consideration of the balance of spatial resolution, diffraction angle resolution, and signal intensity.

According to the X-ray diffraction measurement apparatus 10 of the present embodiment, the following effects are obtained.

According to the X-ray diffraction measurement apparatus 10 of (1), the first two-dimensional detector 18a and the second two-dimensional detector 18b detect the intensities of the passing X-rays passing through the first slit 24a, the second slit 24b, and the third slit 24c of the first passage limiting member 26a, the second passage limiting member 26b, and the third passage limiting member 26c for each of the passing x-rays, and the profile calculator 44 calculates the diffraction profiles related to the passing X-rays for each of the passing X-rays based on the output of the detection. Thus, it is possible to obtain measurement results relating to properties of a plurality of materials having different diffraction angles at the same time.

According to the X-ray diffraction measurement apparatus 10 of (2), the first two-dimensional detector 18a arranged at the position of the low-angle peak in the X-ray diffraction peak has a narrower detection region and higher spatial resolution than the second two-dimensional detector 18b arranged at the position of the high-angle peak in the X-ray diffraction peak. Therefore, it becomes easy to identify the diffraction profile on the low angle side where the intervals between the rings of the Debye-Scherrer ring pattern are relatively close.

According to the X-ray diffraction measurement apparatus 10 of (3), the property of the substance exhibiting the diffraction angle of the ultra-low angle is detected using the first passage limiting member 26a which is the passage limiting member of the first form in which the width of the slit of the passage limiting member is relatively narrow, while the property of the substance exhibiting a relatively wide diffraction angle is detected using the second passage limiting member 26b and the third passage limiting member 26c which are the passage limiting members of the second form. Thus, it is possible to detect the diffraction profile on the low angle side where the intervals between the rings of the Debye-Scherrer ring pattern are relatively close with high spatial resolution, and to detect the diffraction profile on the wide angle side with good signal intensity at the same time.

According to the X-ray diffraction measurement apparatus 10 of (4), the first two-dimensional detector 18a having a relatively narrow detection region detects the intensity of the passing X-ray from the first passage limiting member 26a which is the passage limiting member corresponding to the first form. At the same time, the second two-dimensional detector 18b having a relatively wide detection region detects the intensities of the passing X-rays from the second passage limiting member 26b and the third passage limiting member 26c corresponding to the second form. Thus, it is possible to utilize without waste the wide detection region of the second two-dimensional detector 18b, and to obtain measurement results relating to properties of a plurality of materials having different diffraction angles.

According to the X-ray diffraction measurement apparatus 10 of (5), regarding each of the first passage limiting member 26a, the second passage limiting member 26b, and the third passage limiting member 26c, the servo mechanism 28 can adjust at least any position and/or posture of the position in the in-plane direction of the xz plane orthogonal to the direction of the outgoing optical axis, the position in the direction of the outgoing optical axis, and the inclination angle $\phi$ in the inclination direction B with respect to the orthogonal direction A which is the rotational posture around the outgoing optical axis. Therefore, it is possible to appropriately adjust the positions and/or postures of the first passage limiting member 26a, the second passage limiting member 26b, and the third passage limiting member 26c, and to obtain the measurement results with high accuracy and reliability.

According to the X-ray diffraction measurement apparatus 10 of (6), the servo mechanism 28 controls independently the positions and/or postures of the first passage limiting member 26a, the second passage limiting member 26b, and the third passage limiting member 26c for each of the first passage limiting member 26a, the second passage limiting member 26b, and the third passage limiting member 26c. Therefore, the position and/or posture of each of the first passage limiting member 26a, the second passage limiting member 26b, and the third passage limiting member 26c can be adjusted more appropriately.

According to the X-ray diffraction measurement apparatus 10 of (7), since each of the first passage limiting member 26a, the second passage limiting member 26b, and the third passage limiting member 26c is a tungsten plate, the passage of the X-rays can be strictly limited to the regions of the first slit 24a, the second slit 24b, and the third slit 24c.

According to the X-ray diffraction measurement method of (8), the diffraction profile of the passing X-ray of each of the first passage limiting member 26a, the second passage limiting member 26b, and the third passage limiting member 26c at the positions arranged in the passage limiting member pre-arrangement step S11 are calculated in the diffraction profile calculating step S12. Next, it is evaluated in the evaluating step S13 whether the calculated profile satisfies the conditions to be treated as the measurement result with respect to the diffraction angle resolution and/or the spatial resolution. Further, according to the evaluation result in the evaluating step S13, the arrangement in the passage limiting member pre-arrangement step S11 of each of the first passage limiting member 26a, the second passage limiting member 26b, and the third passage limiting member 26c is changed and adjusted in the arrangement adjusting step S14. Thus, it is possible to obtain measurement results relating to properties of a plurality of materials having different diffraction angles with high accuracy and reliability at the same time.

Although the embodiment of the present invention has been described above, the present invention is not limited to the embodiment. The detailed configuration may be changed as appropriate within the scope of the present invention. For example, various arrangements according to the type of the object to be measured are learned, and the arrangement in the passage limiting member pro-arrangement step S11 of each of the first passage limiting member 26a, the second passage limiting member 26b, and the third passage limiting member 26c may be configured in a manner such that the operator can appropriately select from the various learned arrangements.

EXPLANATION OF REFERENCE NUMERALS

10 X-ray diffraction measurement apparatus
12 X-ray generator
14 incident-side passage limiting mechanism
16a first outgoing-side passage limiting mechanism
16b second outgoing-side passage limiting mechanism
16c third outgoing-side passage limiting mechanism
18a first two-dimensional detector
18b second two-dimensional detector
20 control device
24a first slit
24b second slit
24c third slit
26a first passage limiting member
26b second passage limiting member
26c third passage limiting member
28 servo mechanism
28a first drive unit
28b second drive unit
28c third drive unit
30 incident optical axis
32a, 32b, 32c outgoing optical axis
34 intersection position
40 synchronous control unit
42 information acquisition unit
44 profile calculator
46 property measurement unit
47 servo command unit
51 to 54 pattern
64 linear pattern group
70 two-dimensional X-ray image
72 filter image
73m, 73p boundary line 74 processed X-ray image
76 dotted pattern group
78 conic curve
80a, 80b, 80c one-dimensional X-ray image

What is claimed is:

1. An X-ray diffraction measurement apparatus configured to measure properties of an object to be measured based on X-ray diffraction generated by the object to be measured at an intersection position between an incident optical axis and outgoing optical axes, the X-ray diffraction measurement apparatus comprising:
passage limiting members having linear slits through which X-rays are allowed to pass after the X-ray diffraction;
two-dimensional detectors configured to detect the X-rays, which have passed through the slits, within a detection region; and
a profile calculator configured to calculate a diffraction profile indicating an X-ray intensity with respect to a diffraction angle of the object to be measured, based on a two-dimensional X-ray image detected by the two-dimensional detectors, wherein
a plurality of the passage limiting members are provided on a plurality of the outgoing optical axes corresponding to different diffraction angles, respectively,
each of the plurality of passage limiting members is disposed in a manner such that the slit is inclined at least in an axial direction of the outgoing optical axis corresponding to the slit with respect to an orthogonal direction which is orthogonal to both the incident optical axis and the outgoing optical axis corresponding to the slit,
each of the two-dimensional detectors detects each of intensities of passing X-rays corresponding to the plurality of passage limiting members, and
the profile calculator calculates each of diffraction profiles, which are related to the passing X-rays of the plurality of passage limiting members, respectively, for each of the passing X-rays, based on outputs of the two-dimensional detectors,
wherein the two-dimensional detectors include a first two-dimensional detector arranged at a position of a low-angle peak in an X-ray diffraction peak and a second two dimensional detector arranged at a positron of a high angle peak in the X ray diffraction peak, and the first two-dimensional detector has a narrower detection region and higher spatial resolution than the second two-dimensional detector.

2. The X-ray diffraction measurement apparatus according to claim 1, wherein the passage limiting members include a passage limiting member of a first form provided on the outgoing optical axis corresponding to a diffraction angle of an ultra-low angle and passage limiting members of a second form provided on the outgoing optical axes corresponding to a diffraction angle of a wider angle than the ultra-low angle.

3. The X-ray diffraction measurement apparatus according to claim 2, wherein the two-dimensional detectors include a first two-dimensional detector arranged at a position of a low-angle peak in an X-ray diffraction peak and a second two-dimensional detector arranged at a position of a high-angle peak in the X-ray diffraction peak, and the first two-dimensional detector has a narrower detection region and higher spatial resolution than the second two-dimensional detector, the first two-dimensional detector detects an intensity of a passing X-ray from a first passage limiting member, which is the one passage limiting member corresponding to the first form, and
the second two-dimensional detector detects intensities of passing X-rays from a second passage limiting member and a third passage limiting member which are the two passage limiting members corresponding to the second form.

4. The X-ray diffraction measurement apparatus according to claim 3, wherein the first passage limiting member, the second passage limiting member, and the third passage limiting member are arranged in a manner such that at least any position and/or posture of positions in an in-plane direction orthogonal to the outgoing optical axes corresponding to the first passage limiting member, the second passage limiting member, and the third passage limiting member, positions in directions of the outgoing optical axes, and rotational postures around the outgoing optical axes is adjustable, and
a servo mechanism is provided to adjust the positions and/or the postures of the first passage limiting member, the second passage limiting member, and the third passage limiting member based on an output of the profile calculator.

5. The X-ray diffraction measurement apparatus according to claim 4, wherein the servo mechanism adjusts independently the positions and/or the postures of the first passage limiting member, the second passage limiting member, and the third passage limiting member, for each of the first passage limiting member, the second passage limiting member, and the third passage limiting member.

6. The X-ray diffraction measurement apparatus according to claim 1, wherein each of the passage limiting members is a tungsten plate.

7. An X-ray diffraction measurement method of measuring properties of an object to be measured based on X-ray diffraction generated by the object to be measured at an intersection position between an incident optical axis and outgoing optical axes, the X-ray diffraction measurement method comprising:
a passage limiting member pre-arrangement step of arranging a plurality of passage limiting members formed with linear slits through which X-rays causing the X-ray diffraction pass on a plurality of outgoing optical axes corresponding to different diffraction angles, respectively, in a manner such that each of the slits is inclined at least in an axial direction of the outgoing optical axis corresponding to the slit with respect to an orthogonal direction which is orthogonal to both the incident optical axis and the outgoing optical axis corresponding to the slit;
a diffraction profile calculating step of detecting the X-rays passing through the slits of the plurality of passage limiting members arranged in the passage limiting member pre-arrangement step, using a first two-dimensional detector arranged at a position of a low-angle peak in an X-ray diffraction peak and having a relatively narrow detection region and higher spatial resolution and a second two-dimensional detector arranged at a position of a high-angle peak in the X-ray diffraction peak and having a wider detection region and lower spatial resolution, and classifying and calculating diffraction profiles indicating an X-ray intensity with respect to a diffraction angle of the object to be measured as diffraction profiles related to X-rays passing through the plurality of passage limiting members based on the two-dimensional X-ray images by the detection;

an evaluating step of evaluating the diffraction profiles related to the X-rays passing through the plurality of passage limiting members calculated in the diffraction profile calculating step whether the profile satisfies conditions to be treated as a measurement result for diffraction angle resolution and/or spatial resolution; and an arrangement adjusting step of changing and adjusting the arrangement of the plurality of passage limiting members in the passage limiting member pre-arrangement step according to the evaluation result in the evaluating step.

* * * * *